US009995319B2

(12) United States Patent
Jones et al.

(10) Patent No.: US 9,995,319 B2
(45) Date of Patent: Jun. 12, 2018

(54) HYDRAULIC ALTERNATING SYSTEM FOR AGRICULTURAL BALER

(71) Applicant: Deere & Company, Moline, IL (US)

(72) Inventors: Austin J. Jones, Ottumwa, IA (US); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 229 days.

(21) Appl. No.: 15/142,790

(22) Filed: Apr. 29, 2016

(65) Prior Publication Data

US 2017/0089363 A1  Mar. 30, 2017

Related U.S. Application Data

(60) Provisional application No. 62/235,456, filed on Sep. 30, 2015.

(51) Int. Cl.
*F15B 1/20* (2006.01)
*F15B 11/20* (2006.01)
(Continued)

(52) U.S. Cl.
CPC ............ *F15B 11/20* (2013.01); *A01D 85/005* (2013.01); *A01F 15/07* (2013.01);
(Continued)

(58) Field of Classification Search
CPC .. F15B 1/04; F15B 11/20; A01F 15/07; A01F 15/0883; A01D 85/005
See application file for complete search history.

(56) References Cited

U.S. PATENT DOCUMENTS 3,163,302 A   12/1964  Pridgeon
3,402,832 A    9/1968  Wehde
(Continued)

FOREIGN PATENT DOCUMENTS

AU         568143       12/1987
AU       2003262343     6/2005
(Continued)

OTHER PUBLICATIONS

EP16190919.7 Extended European Search Report dated Jan. 27, 2017 (9 pages).

*Primary Examiner* — F. Daniel Lopez
*Assistant Examiner* — Abiy Teka
(74) *Attorney, Agent, or Firm* — Michael Best & Friedrich LLP

(57) ABSTRACT

A hydraulic circuit includes a control valve, a first hydraulic actuator, and a second hydraulic. The hydraulic circuit is configured such that in a first step, the first hydraulic actuator opens a product barrier in response to movement of the control valve into a first position, in a second step, the second hydraulic actuator moves a product engagement member in a first direction and the first hydraulic actuator closes the product barrier in response to movement of the control valve into a second position, in a third step, the first hydraulic actuator opens the product barrier in response to movement of the control valve into the first position, and in a fourth step, the second hydraulic actuator moves the product engagement member in a second direction and the first hydraulic actuator closes the product barrier in response to movement of the control valve into the second position.

20 Claims, 21 Drawing Sheets

(51) Int. Cl.
*A01F 15/07* (2006.01)
*A01F 15/08* (2006.01)
*F15B 1/04* (2006.01)
*A01D 85/00* (2006.01)

(52) U.S. Cl.
CPC ............ *A01F 15/0883* (2013.01); *F15B 1/04* (2013.01); *A01D 2085/007* (2013.01); *A01D 2085/008* (2013.01)

(56) References Cited

U.S. PATENT DOCUMENTS

| | | |
|---|---|---|
| 3,587,877 A | 6/1971 | Hornibrook |
| 3,677,348 A | 7/1972 | Boetto et al. |
| 3,785,391 A | 1/1974 | Miller |
| 4,067,394 A * | 1/1978 | Deckler .................. A01B 63/10 172/130 |
| 4,215,964 A | 8/1980 | Schrag et al. |
| 4,310,275 A | 1/1982 | Hoelscher |
| 4,341,148 A | 7/1982 | Kosarzecki |
| 4,483,247 A | 11/1984 | Coeffic |
| 4,488,476 A | 12/1984 | Diel et al. |
| 4,710,086 A | 12/1987 | Naaktgeboren et al. |
| 4,710,087 A | 12/1987 | Naaktgeboren et al. |
| 4,844,675 A | 7/1989 | Strosser et al. |
| 4,955,774 A | 9/1990 | Van Eecke et al. |
| 4,961,679 A | 10/1990 | Van Eecke et al. |
| 5,664,923 A | 9/1997 | Olin |
| 5,842,823 A | 12/1998 | Kohnen et al. |
| 6,053,685 A | 4/2000 | Tomchak |
| 6,272,825 B1 | 8/2001 | Anderson et al. |
| 6,425,235 B1 | 7/2002 | Spaniol et al. |
| 6,851,908 B2 | 2/2005 | Bergen et al. |
| 7,000,533 B2 | 2/2006 | Derscheid et al. |
| 7,246,479 B2 | 7/2007 | Spaniol et al. |
| 7,401,547 B2 | 7/2008 | Degen |
| 7,472,649 B1 * | 1/2009 | Derscheid ........... A01F 15/0883 100/7 |
| 7,621,709 B2 | 11/2009 | Heitz, Jr. |
| 8,567,169 B2 | 10/2013 | Spaniol et al. |
| 2005/0257513 A1 | 11/2005 | Smith et al. |
| 2006/0086263 A1 | 4/2006 | Degen |
| 2013/0089394 A1 | 4/2013 | Straeter |
| 2016/0014968 A1 | 1/2016 | Kraus et al. |
| 2016/0014969 A1 | 1/2016 | Kraus et al. |
| 2016/0014970 A1 | 1/2016 | Kraus et al. |
| 2016/0014971 A1 | 1/2016 | Kraus |

FOREIGN PATENT DOCUMENTS

| | | |
|---|---|---|
| CA | 2709397 | 5/2000 |
| DE | 2851117 | 6/1980 |
| EP | 983720 | 3/2000 |
| EP | 2923560 | 9/2015 |
| FR | 2679410 | 1/1993 |
| FR | 2679732 | 2/1993 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| WO | 2013049308 | 4/2013 |
| WO | WO 2014031355 | 2/2014 |

* cited by examiner

HYDRAULIC ALTERNATING SYSTEM FOR AGRICULTURAL BALER

CROSS-REFERENCE TO RELATED APPLICATIONS

This application claims the benefit of priority to U.S. application Ser. No. 62/235,456, filed Sep. 30, 2015, the content of which is incorporated herein by reference in its entirety.

BACKGROUND

The present disclosure relates to a hydraulic alternating system for an agricultural baler.

SUMMARY

In one aspect, the disclosure provides a hydraulic circuit including a selective control valve actuatable between a first position and a second position, a first hydraulic actuator operable to open and close a product barrier, and a second hydraulic actuator operable to move a product engagement member. The hydraulic circuit is configured such that in a first step, the first hydraulic actuator opens the product barrier and the second hydraulic actuator moves the product engagement member in a first direction in response to movement of the selective control valve into the first position, in a second step, the first hydraulic actuator closes the product barrier and the product engagement member remains in place in response to movement of the selective control valve into the second position, in a third step, the first hydraulic actuator opens the product barrier and the second hydraulic actuator moves the product engagement member in a second direction opposite the first direction in response to movement of the selective control valve into the first position, and in a fourth step, the first hydraulic actuator closes the product barrier and the product engagement member remains in place in response to movement of the selective control valve into the second position.

In another aspect, the disclosure provides a hydraulic circuit including a selective control valve actuatable between a first position and a second position, a first hydraulic actuator operable to open and close a product barrier, and a second hydraulic actuator operable to move a product engagement member. The hydraulic circuit is configured such that in a first step, the first hydraulic actuator opens the product barrier and the product engagement member remains in place in response to movement of the selective control valve into the first position, in a second step, the second hydraulic actuator moves the product engagement member in a first direction and the first hydraulic actuator closes the product barrier in response to movement of the selective control valve into the second position, in a third step, the first hydraulic actuator opens the product barrier and the product engagement member remains in place in response to movement of the selective control valve into the first position, and in a fourth step, the second hydraulic actuator moves the product engagement member in a second direction opposite the first direction and the first hydraulic actuator closes the product barrier in response to movement of the selective control valve into the second position.

In yet another aspect, the disclosure provides a hydraulic circuit including a first selective control valve actuatable between a first position and a second position, a second selective control valve actuatable in a first position, a first hydraulic actuator operable to open and close a product barrier, and a second hydraulic actuator operable to move a product engagement member. The hydraulic circuit is configured such that in a first step, the first hydraulic actuator opens the product barrier in response to movement of the first selective control valve into the first position, in a second step, the second hydraulic actuator moves the product engagement member in a first direction in response to movement of the second selective control valve into the first position, in a third step, the first hydraulic actuator closes the product barrier in response to movement of the first selective control valve into the second position, in a fourth step, the first hydraulic actuator opens the product barrier in response to movement of the first selective control valve into the first position, in a fifth step, the second hydraulic actuator moves the product engagement member in a second direction opposite the first direction in response to movement of the second selective control valve into the first position, and in a sixth step, the first hydraulic actuator closes the product barrier in response to movement of the first selective control valve into the second position.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
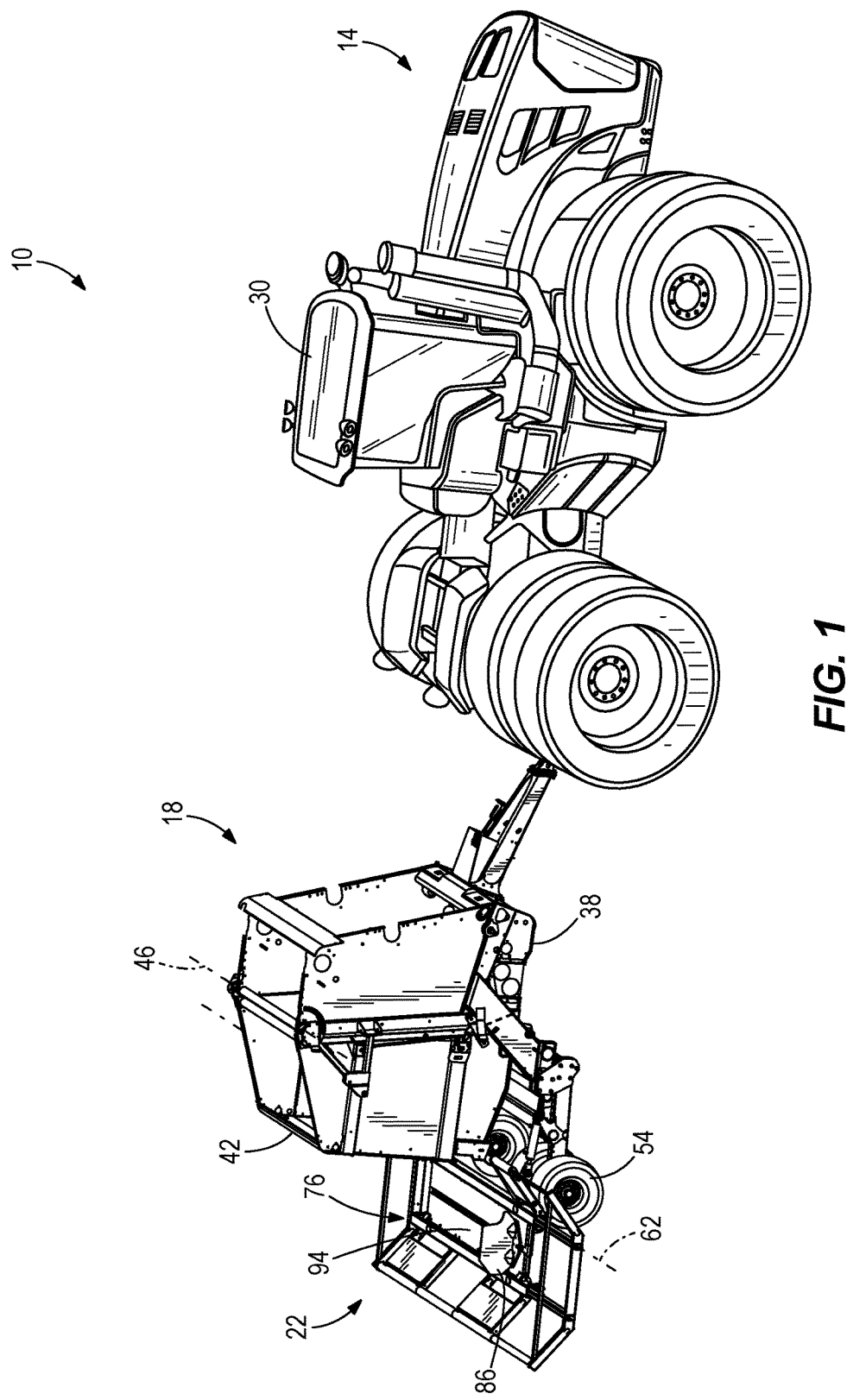
FIG. 1 is a perspective view of agricultural equipment including a vehicle coupled to an agricultural baler and an accumulator according to an embodiment of the disclosure.

FIG. 1 illustrates certain agricultural equipment 10 including a tractor 14, a baler 18, and a crop package accumulator 22. The baler 18 (e.g., a crop packaging system) and the accumulator 22 (e.g., a crop package handling system) are both coupled to the tractor 14 to move the baler 18 and the accumulator 22 during an agricultural process (e.g., through an agricultural field). The tractor 14 also supplies operational power in the form of hydraulic, electrical, and/or mechanical power to the baler 18 and the accumulator 22. For example, a portion of a hydraulic control system is located within a cab 30 of the tractor 14 to actuate and operate components of the baler 18 and the accumulator 22, as discussed in detail below.

The illustrated baler 18 is configured to produce cylindrical crop packages, e.g., round bales, from an agricultural field. For example, the baler 18 may produce crop packages from hay, corn stalks, and the like. In other embodiments, the baler 18 may produce cuboid crop packages, e.g., square bales. In the illustrated embodiment, the baler 18 includes a baler frame 38 to which a baler gate or a crop product barrier 42 is pivotally coupled about a first axis 46. The illustrated gate 42 is positionable between a closed position (FIG. 1) and an open position (FIG. 6) by gate hydraulic actuators 50, e.g., hydraulic cylinders. In other embodiments, the gate 42 may translate or slide between the closed position and the open position.

Figure 2:
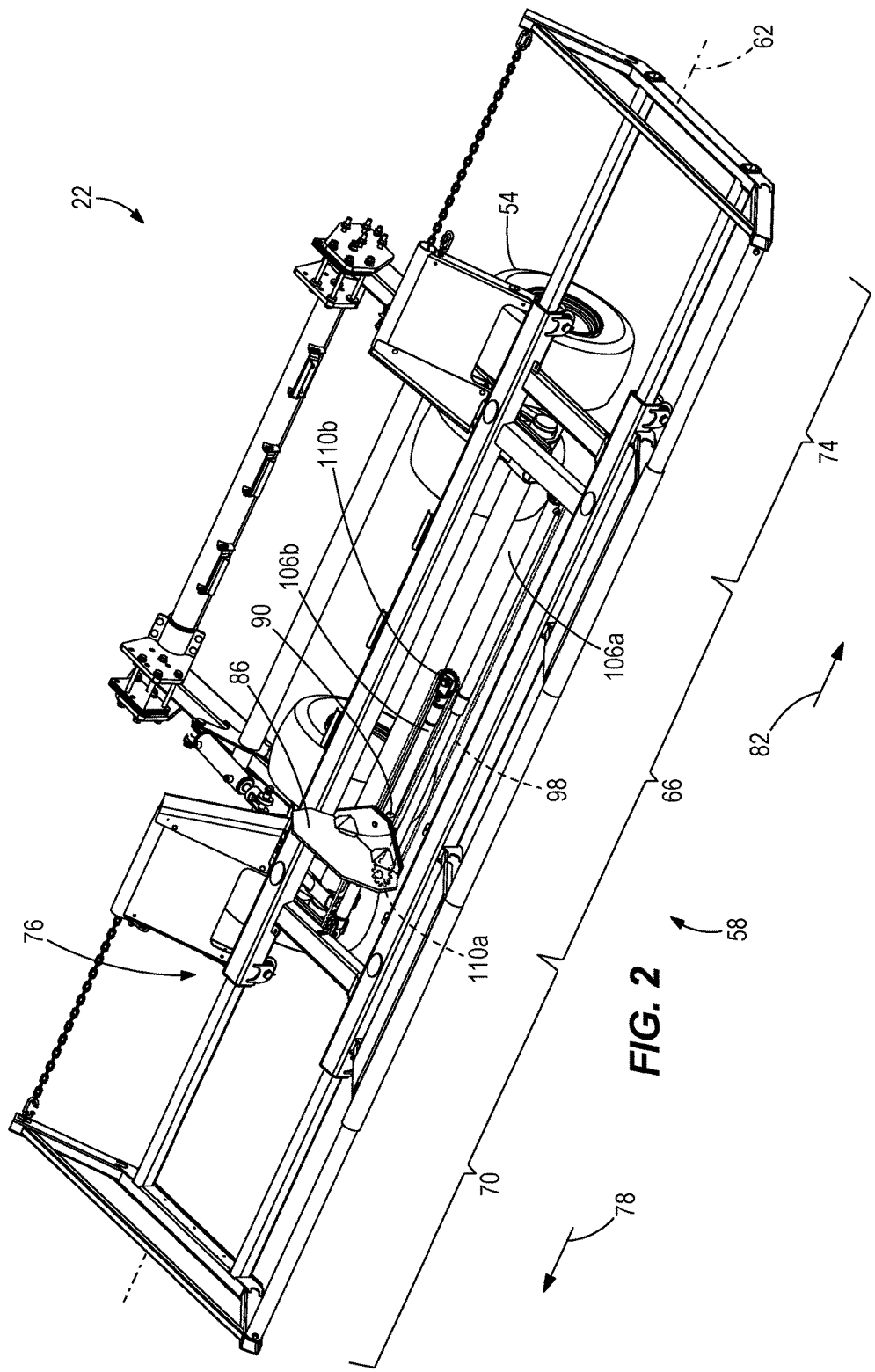
FIG. 2 is a top perspective view of the accumulator of FIG. 1.

With continued reference to FIGS. 1 and 2, the illustrated accumulator 22 is coupled to the baler frame 38 such that the baler 18 and the accumulator 22 are supported by common axles and related structure, e.g., wheels 54, although the accumulator can have its own dedicated axles, wheels, and other supporting structure. An accumulator frame 58 is pivotably coupled relative to the baler frame 38 about a second axis 62 and includes a middle frame portion 66, a first side frame portion 70, and a second side frame portion 74. The illustrated portions 66, 70, 74 define a bale carriage area 76 configured to support the crop packages (not shown in FIGS. 1 and 2). The middle frame portion 66 is positioned between the side frame portions 70, 74 with the side frame portions 70, 74 slidably extendable relative to the middle frame portion 66 parallel to a first direction arrow 78 and a second direction arrow 82. In other embodiments, the side frame portions 70, 74 may pivot relative to the middle frame portion 66 about an axis generally perpendicular to the second axis 62, e.g., the side frame portions 70, 74 fold into the middle frame portion 66, to achieve lateral movement of the side frame portions 70, 74.

Figure 3:
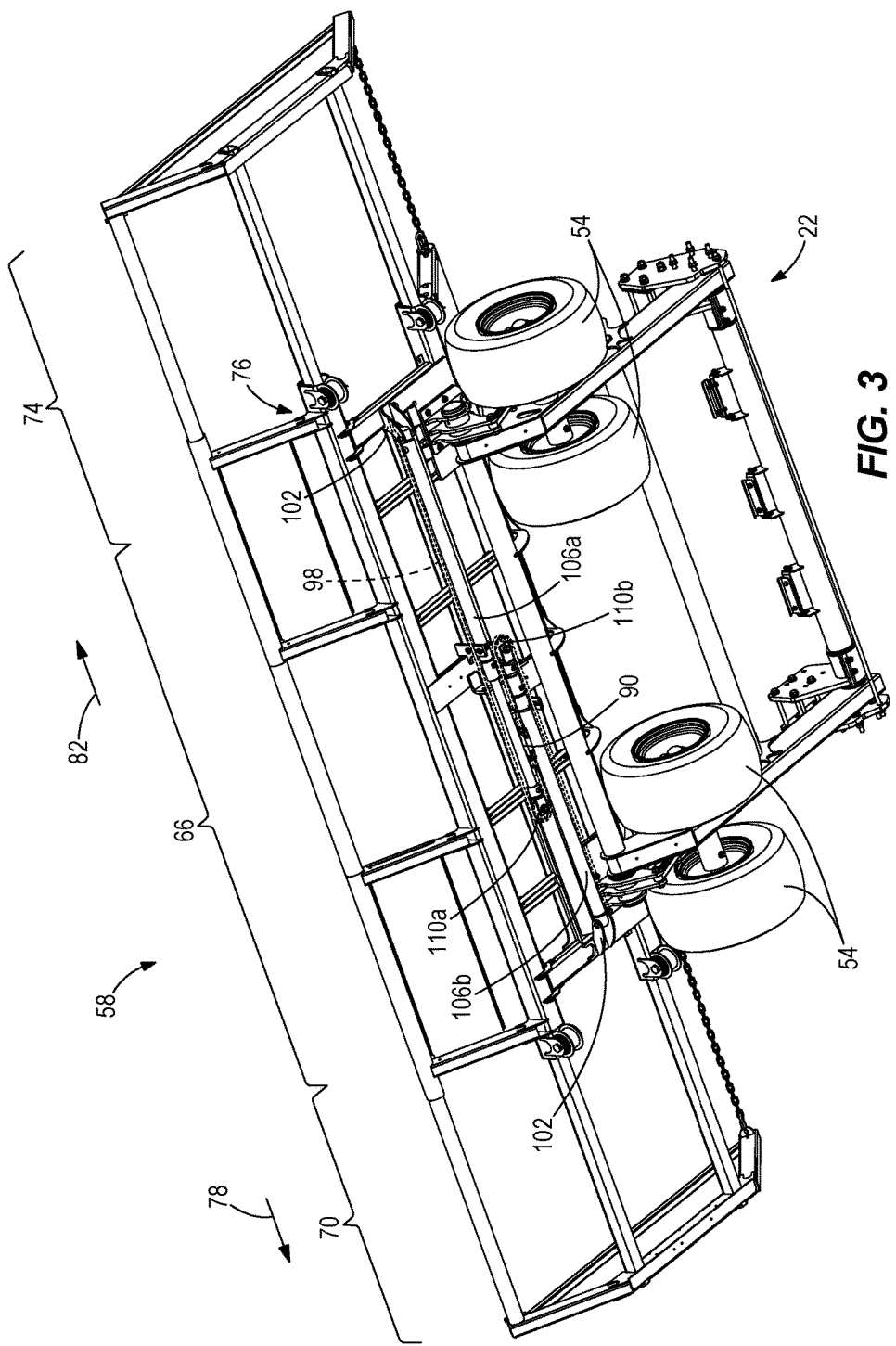
FIG. 3 is a bottom partial perspective view of the accumulator of FIG. 1.

With reference to FIGS. 2 and 3, a bale moving member 86 (e.g., a crop package or product engagement member) is illustrated as a plate member oriented substantially perpendicular to the second axis 62, is slidably coupled to the middle frame portion 66, and is slidable in the directions 78, 82. In other words, the bale moving member 86 is movable in two opposing directions (e.g., left and right or up and down). The illustrated bale moving member 86 includes a base 90 that extends below a platform 94 (shown in FIG. 1 but not shown in FIG. 2 for clarity of other components associated with the accumulator 22) of the middle frame portion 66, and is fixedly coupled to a linkage 98, e.g., a roller chain. In other embodiments, the linkage 98 may be another flexible linkage, e.g., a cable, rope, or the like. Both ends 102 (FIG. 3) of the linkage 98 are fixed relative to a crop package hydraulic actuator 106, e.g., hydraulic actuators or cylinders 106a, 106b, each including a sprocket 110 that engages the linkage 98. For example, the first crop package hydraulic actuator 106a is coupled to a first sprocket 110a, and the second crop package hydraulic actuator 106b is coupled to a second sprocket 110b. In the illustrated embodiment, the sprockets 110a, 110b uniformly move together in either direction 78, 82 via engagement between the linkage 98 and the sprockets 110a, 110b. Accordingly, extension of the first hydraulic actuator 106a moves the first sprocket 110a in the first direction 78, which pulls the linkage 98 and therefore the base 90 and bale moving member 86 in the first direction, and extension of the second hydraulic actuator 106b moves the second sprocket 110b in the second direction 82, which pulls the linkage 98 and therefore the base 90 and bale moving member 86 in the second direction 82. In other embodiments, the crop package hydraulic actuators 106a, 106b may be one hydraulic actuator that is able to move the sprockets 110a, 110b in either direction 78, 82 (FIGS. 13-21).

Figure 4:
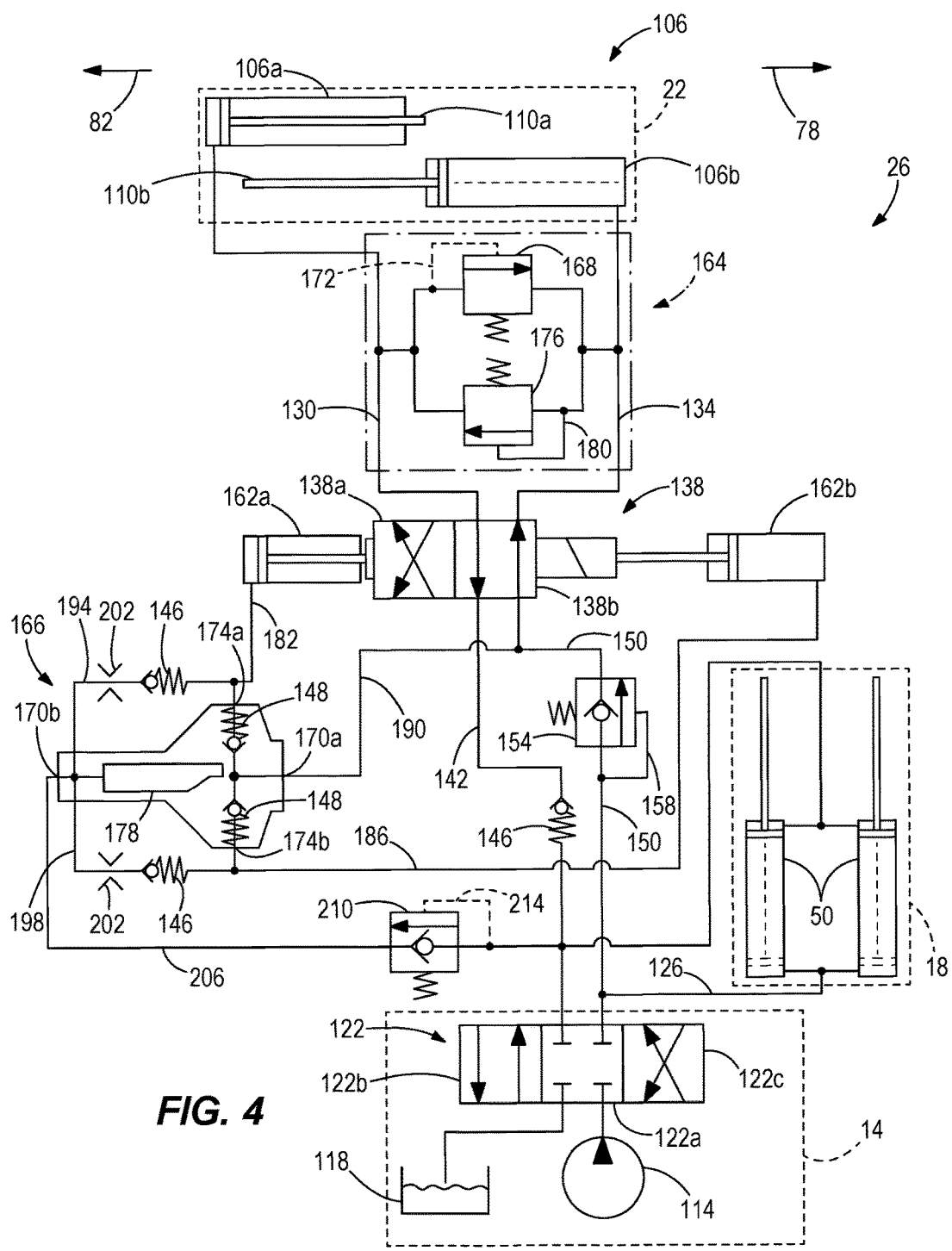
FIG. 4 is a schematic diagram of an embodiment of a hydraulic system coupled to the agricultural equipment of FIG. 1.
Figure 8:
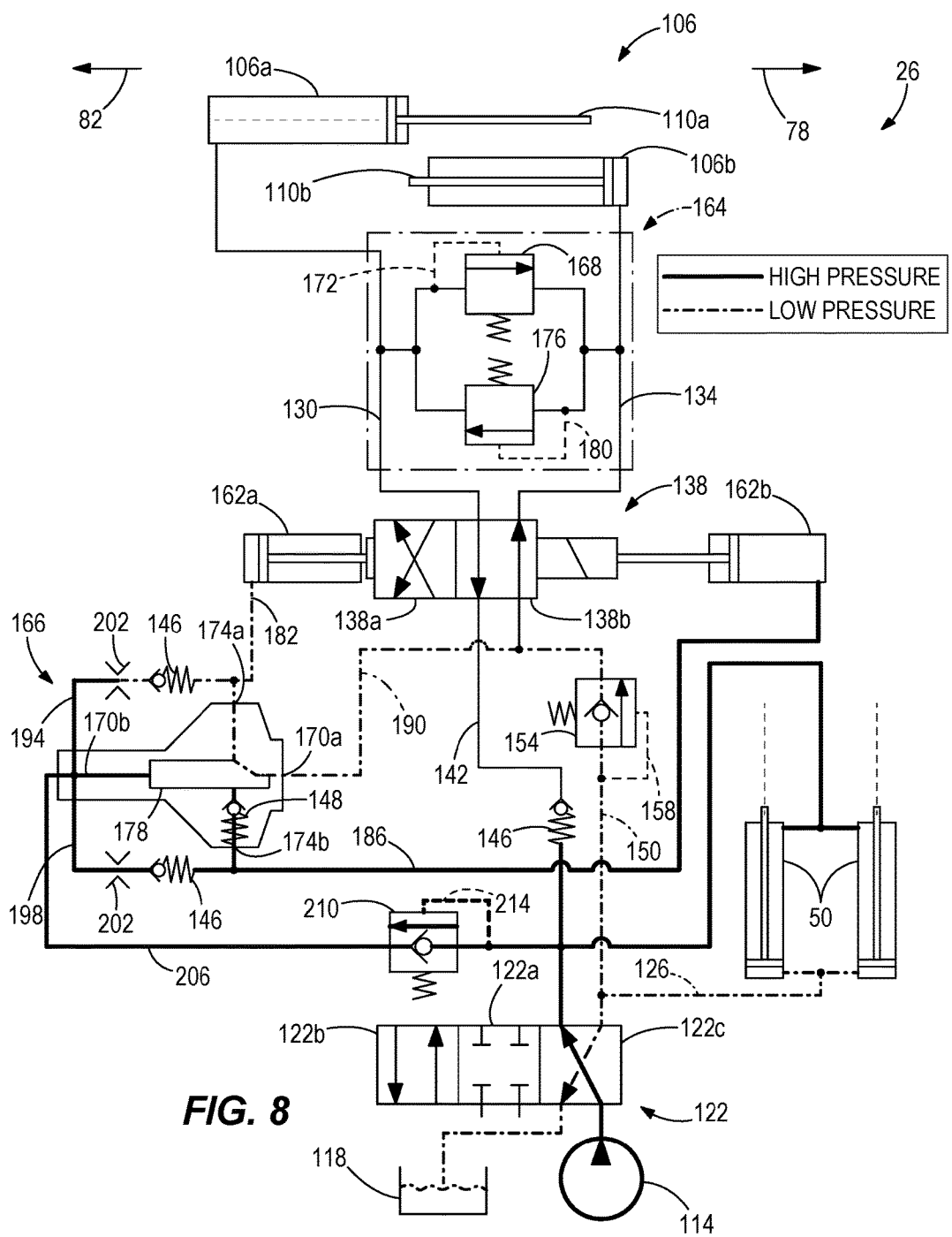
FIG. 8 is a schematic diagram of the hydraulic system of FIG. 4 in a second configuration when the gate of the baler closes after the first crop package exits the baler.

With reference to FIG. 4, a hydraulic control system or hydraulic circuit 26 is illustrated as a closed loop system. In the illustrated embodiment, the hydraulic control system 26 is operable by hydraulic fluid; however, in other embodiments, the control system 26 may be pneumatically operable. A hydraulic pump 114 and a hydraulic reservoir 118, which are associated with the tractor 14, are fluidly coupled to a first selective control valve 122. The first selective control valve 122 is positionable in three positions such that the pump 114 and the reservoir 118 are coupled to the control valve 122 in a first position 122a (FIG. 4), a second position 122b (FIG. 5), and a third position 122c (FIG. 8). The control valve 122 is operable by a user located within the tractor cab 30. In other embodiments, the control valve 122 may be automatically actuated (e.g., by electric sensors). In addition, the control valve 122 is fluidly coupled to the gate hydraulic actuators 50 by a first hydraulic line 126, fluidly coupled to the first crop package hydraulic actuator 106a (second line 130), and fluidly coupled to the second crop package hydraulic actuator 106b (third line 134), further described below.

The first selective control valve 122 is directly coupled to a second selective control valve 138 by a fourth hydraulic line 142 including a check valve 146 and a fifth hydraulic line 150 including a first relief check valve 154. The fifth hydraulic line 150 is in fluid communication with the first hydraulic line 126 and is in selective communication with the second hydraulic line 130 and the third hydraulic line 134. The first relief check valve 154 functions as a conventional check valve (e.g., allowing fluid to flow in only one direction) until a predetermined fluidic pressure acts against the first relief check valve 154 causing fluid to bypass the first relief check valve 154 utilizing a first hydraulic relief line 158. In particular, the first relief check valve 154 is spring biased to a predetermined fluidic pressure threshold. In the illustrated embodiment, the predetermined fluidic pressure is adjustable dependent upon specific applications of the hydraulic control system 26.

Figure 9:
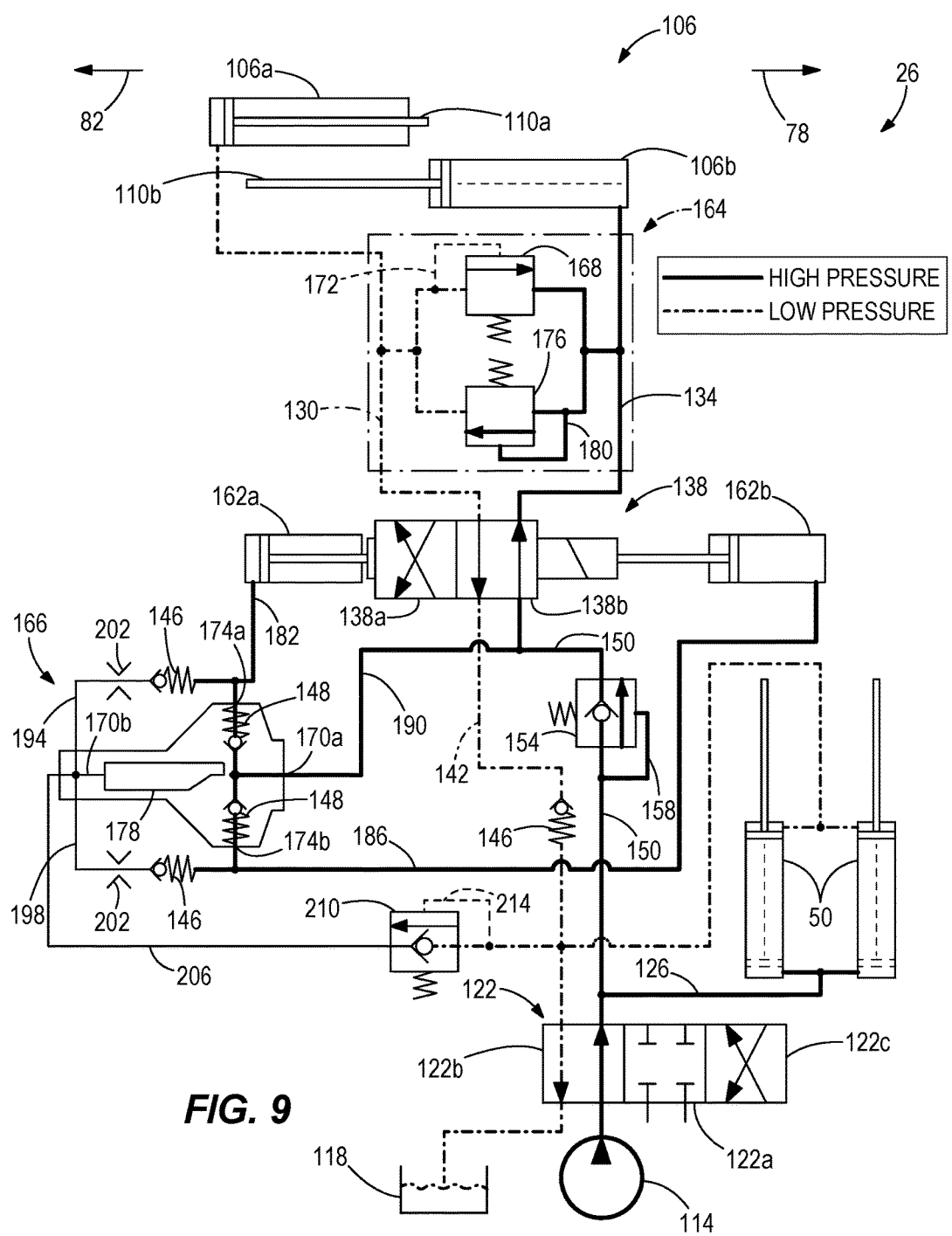
FIG. 9 is a schematic diagram of the hydraulic system of FIG. 4 in a third configuration when the gate of the baler opens and a second crop package exits the baler.

The second selective control valve 138 is fluidly coupled to the fourth and the fifth hydraulic lines 142, 150 in a first position 138a (FIG. 5) and a second position 138b (FIG. 9). In particular, the second selective control valve 138 is operable between the two positions 138a, 138b by hydraulic switching actuators 162a, 162b, e.g., pilot-operated valves or cam spool valves.

An override mechanism 164 is located fluidly between the second selective control valve 138 and the crop package hydraulic actuators 106. The illustrated override mechanism 164 includes a first control valve 168 having a relief line 172 and a second control valve 176 having a relief line 180. The first and the second control valves 168, 176 allow hydraulic fluid to flow in only one direction after a predetermined fluidic pressure is reached. In the illustrated embodiment, the first control valve 168 is operable to allow fluid to flow from the second hydraulic line 130 to the third hydraulic line 134 via the relief line 172, and the second control valve 176 is operable to allow fluid to flow from the third hydraulic line 134 to the second hydraulic line 130 via the relief line 180. In other embodiments, the override mechanism 164 may be omitted thereby fluidly decoupling the second and the third hydraulic lines 130, 134 between the second selective control valve 138 and the hydraulic actuators 106a, 106b.

The illustrated hydraulic control system 26 also includes a switching valve 166, which is similar to a switching valve disclosed in U.S. Pat. No. 4,488,476, incorporated herein by reference. In particular, the switching valve 166 includes a first aperture 170a, a second aperture 170b, a third aperture 174a, and a fourth aperture 174b with a mechanically actuated check valve 148 associated with the third and the fourth apertures 174a, 174b. A translating switching member 178 is operable to selectively block fluid communication between one of the apertures 174a, 174b and the first aperture 170a. In addition, the translating switching member 178 selectively engages one of the mechanically actuated check valves 148 to allow for opposite fluid flow through the check valve 148. The third aperture 174a is directly coupled to the first hydraulic switching actuator 162a by a sixth hydraulic line 182, and the fourth aperture 174b is directly coupled to the second hydraulic switching actuator 162b by a seventh hydraulic line 186.

In addition, the first aperture 170a is directly coupled to the fifth hydraulic line 150 by an eighth hydraulic line 190. The second aperture 170b is in fluid communication with the sixth hydraulic line 182 via a ninth hydraulic line 194 and is in fluid communication with the seventh hydraulic line 186 via a tenth hydraulic line 198. The ninth and the tenth hydraulic lines 194, 198 both include a check valve 146 and an orifice valve 202, with the orifice valve 202 located fluidly between the check valve 146 and the second aperture 170b. In other embodiments, the orifice valves 202 may be located on the other side of the check valve 146. Furthermore, an eleventh hydraulic line 206 including a second relief check valve 210 having a second hydraulic relief line 214 fluidly couples the gate hydraulic actuators 50 and the switching valve 166. The illustrated second relief check valve 210 is similar to the first relief check valve 154. The eleventh hydraulic line 206 is also in fluid communication with fourth hydraulic line 142, the ninth hydraulic line 194, and the tenth hydraulic line 198.

In operation, as the tractor 14 pulls the baler 18 and the accumulator 22 through the agricultural field, a first crop package begins to form within the baler 18. As the first crop package is forming, the first selective control valve 122 is coupled to the hydraulic pump 114 and the hydraulic reservoir 118 in the first position 122a (FIG. 4). As such, the pump 114 and the reservoir 118 are decoupled from the first hydraulic line 126 and the fourth hydraulic line 142. Once the baler 18 completes the formation of the first crop package, the baler electrically conveys a signal to the cab 30 indicating to the operator of the tractor 14 to actuate the gate 42 to the open position.

Figure 5:
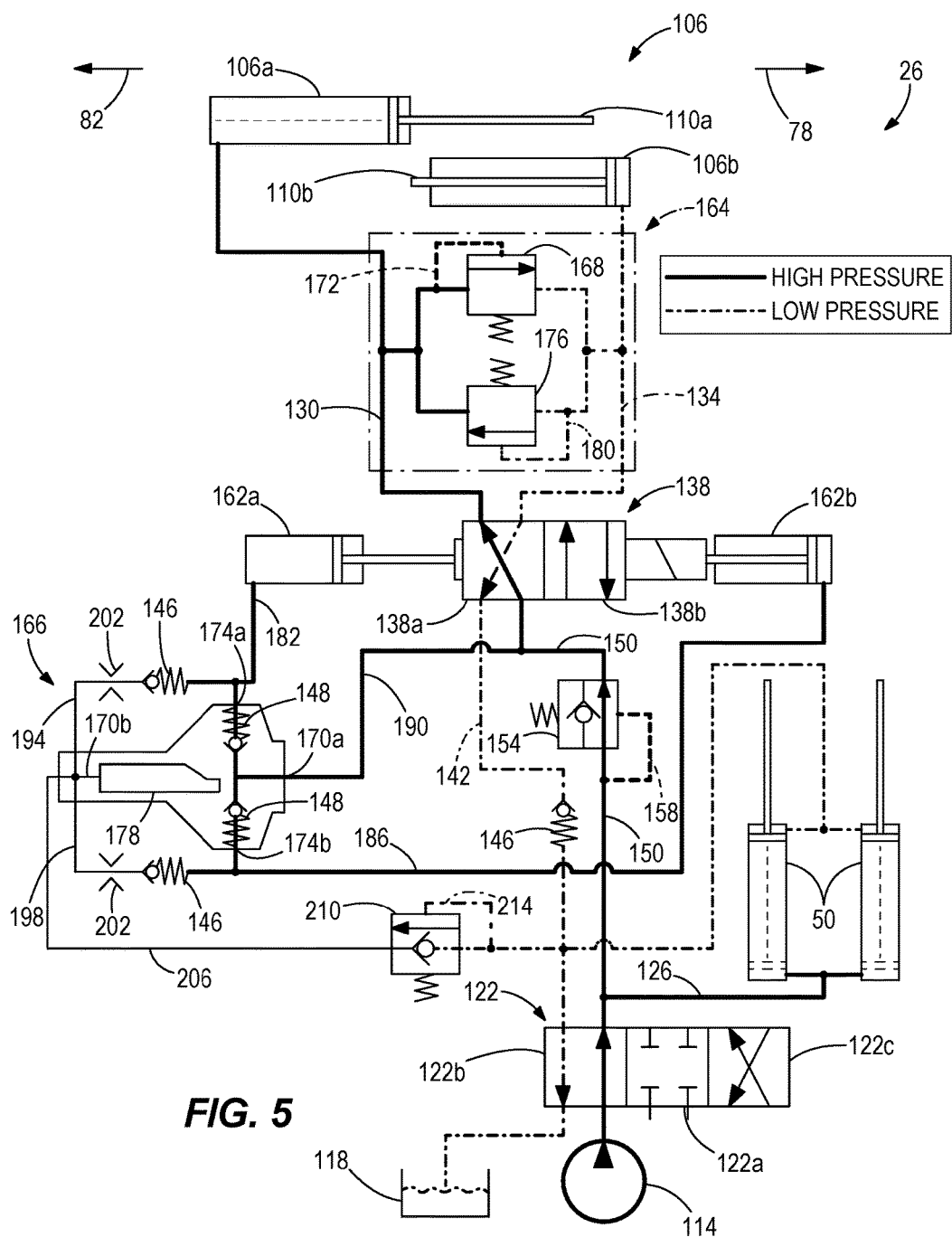
FIG. 5 is a schematic diagram of the hydraulic system of FIG. 4 in a first configuration when a gate of the baler opens and a first crop package exits the baler.
Figure 6:
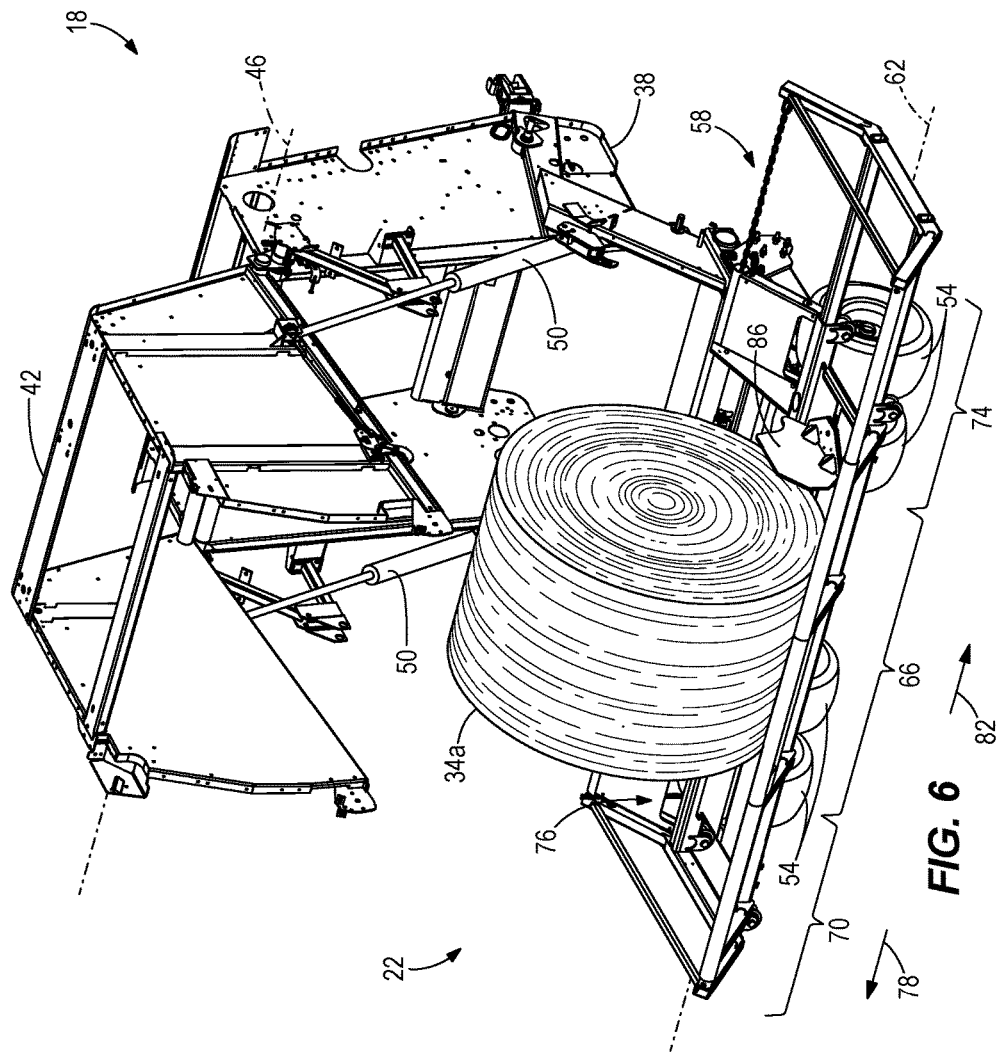
FIG. 6 is a perspective view of the baler and the accumulator with the first crop package located in a middle position on the accumulator.

With reference to FIGS. 5 and 6, the operator accordingly actuates from the cab 30 the first selective control valve 122 into the second position 122b (e.g., a first step of operation of the hydraulic control system 26), which fluidly couples the pump 114 to the gate hydraulic actuators 50 by the first hydraulic line 126, providing hydraulic pressure to the gate hydraulic actuators 50 to raise the gate 42 to the open position. For reference, hydraulic fluidic pressure provided by the pump 114 is illustrated in solid lines and indicated as "high pressure" within FIGS. 5, 8, 9, and 12. Hydraulic fluid that is pushed out of the gate hydraulic actuators 50 travels to the reservoir 118 through the eleventh and the fourth hydraulic lines 206, 142. For reference, hydraulic fluid traveling into the reservoir 118 is illustrated in dashed lines and indicated as "low pressure" within FIGS. 5, 8, 9, and 12. Concurrently, hydraulic fluid travels through the fifth hydraulic line 150 until the hydraulic fluid reaches the first relief check valve 154. As the gate 42 raises, hydraulic pressure within the fifth hydraulic line 150 is less than the predetermined pressure threshold of the first relief check valve 154. When the gate 42 is in the fully open position, e.g., gate hydraulic actuators 50 are fully extended, the first crop package or product 34a exits the baler 18 and moves to the middle frame portion 66.

Figure 7:
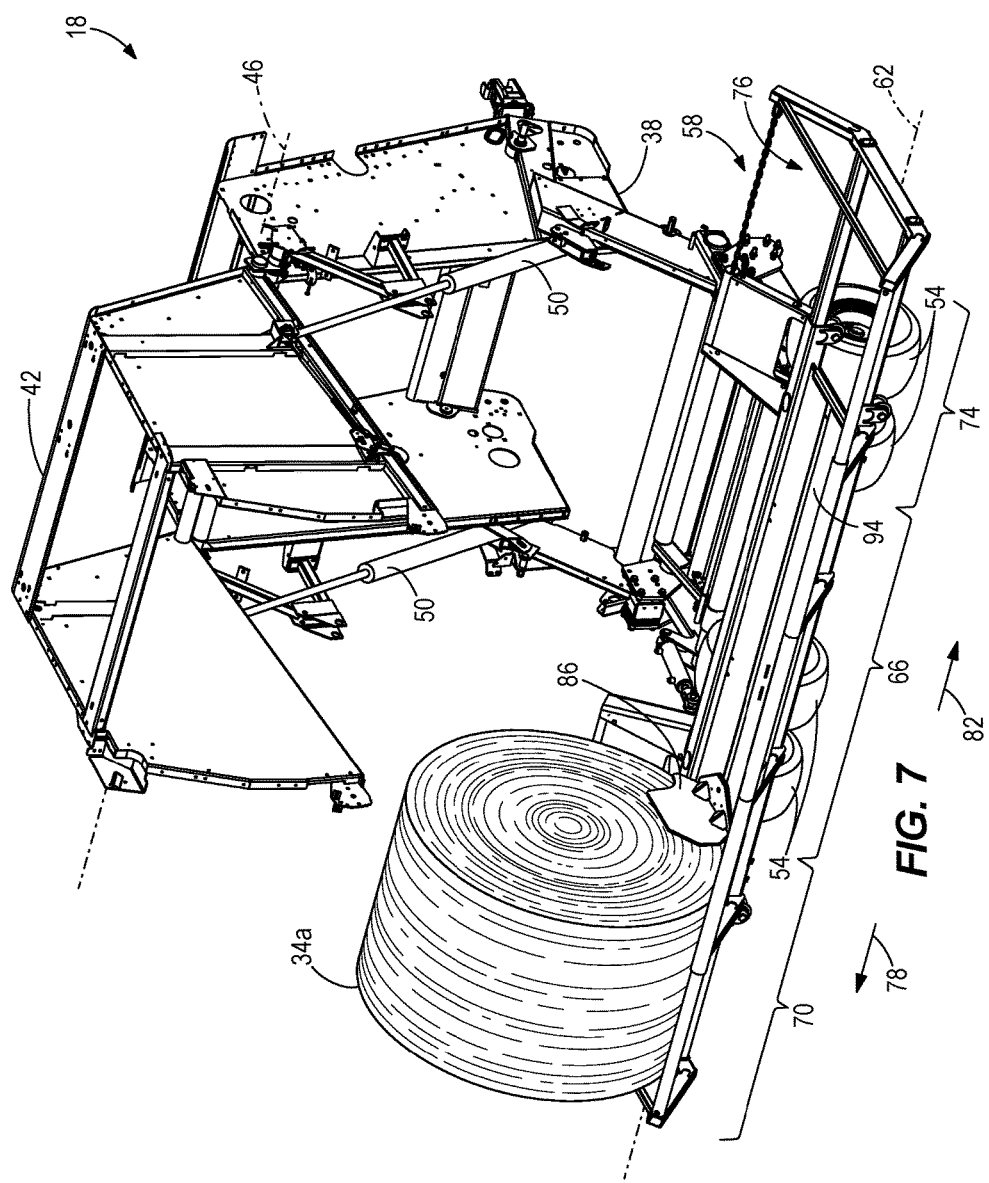
FIG. 7 is a perspective view of the baler and the accumulator with the first crop package located in a first side position on the accumulator.

When the gate hydraulic actuators 50 are fully extended, hydraulic pressure within the fifth hydraulic line 150 increases such that the pressure therein exceeds the predetermined pressure threshold of the first relief check valve 154. Referring again to FIG. 5, hydraulic fluid travels through the first hydraulic relief line 158 to the second selective control valve 138 via the fifth hydraulic line 150 and to the switching valve 166 via the eighth hydraulic line 190 and into inlet 170a. From the switching valve 166, the hydraulic fluid travels through the apertures 174a, 174b to equally pressurize the hydraulic switching actuators 162a, 162b such that the second selective control valve 138 remains in the first position 138a. In the first position 138a, hydraulic fluid travels through the second hydraulic line 130 to the first crop package hydraulic actuator 106a to fully extend and move the sprocket 110a in the direction 78. Accordingly, the bale moving member 86 also moves in the direction 78 to move the first crop package 34a to the first side portion 70 of the bale carriage area 76 (FIG. 7). The second crop package hydraulic actuator 106b also moves in the direction 78 during extension of the first crop package hydraulic actuator 106a by the first sprocket 110a pushing the second sprocket 110b in the direction 78 via the linkage 98. Consequently, hydraulic fluid is pushed through the third and the fourth hydraulic lines 134, 142 to the reservoir 118.

In other embodiments, the first crop package hydraulic actuator 106*a* may not fully extend in the direction 78, but rather, the first crop package hydraulic actuator 106*a*, and ultimately the bale moving member 86, may stop at one or more positions in the direction 78 that are before the fully extended position of the first crop package hydraulic actuator 106*a*.

Should hydraulic pressure within the first crop package hydraulic actuator 106*a* become too great, e.g., if a force is obstructing movement of the bale moving member 86, the override mechanism 164 enables hydraulic fluid within the second hydraulic line 130 to release excess pressure to the third hydraulic line 134 via the first control valve 168. As such, hydraulic pressure within the first crop package hydraulic actuator 106*a* does not exceed a maximum hydraulic pressure.

The operator then actuates the first selective control valve 122 into the third position 122*c* to index the hydraulic control system 26 into the configuration illustrated in FIG. 8 (e.g., a second step of operation of the hydraulic control system 26). As such, the pump 114 is directly coupled to the eleventh hydraulic line 206 to convey hydraulic fluid to the gate hydraulic actuators 50 to close the gate 42 (FIG. 1). Once the gate 42 fully closes, the hydraulic pressure within the eleventh hydraulic line 206 increases until it exceeds the predetermined hydraulic pressure of the second relief check valve 210 to convey hydraulic fluid through the second hydraulic relief line 214 to the switching valve 166. The hydraulic fluid pushes the switching member 178 towards the first aperture 170*a* such that the seventh hydraulic line 186 is not in fluid communication with the eighth hydraulic line 190, but the sixth hydraulic line 182 is in fluid communication with the eighth hydraulic line 190. Specifically, as the switching member 178 translates towards the first aperture 170*a*, the switching member 178 engages the check valve 148, associated with the third aperture 174*a*, to allow hydraulic fluid to flow opposite of the allowed flow direction of the check valve 148.

Hydraulic fluid travels through the check valve 146 and the orifice valve 202, e.g., the tenth hydraulic line 198, to the second hydraulic switching actuator 162*b* to move the second selective control valve 138 into the second position 138*b*. In turn, hydraulic fluid is pushed out of the first hydraulic switching actuator 162*a*. The orifice valve 202, associated with the ninth hydraulic line 194, provides enough back pressure within the hydraulic lines 182, 194 such that hydraulic fluid pressurized from the pump 114 does not move past the check valve 146, and the hydraulic fluid pushed out of the first hydraulic switching actuator 162*a* is allowed to flow through the switching valve 166 and into the reservoir 118.

Figure 10:
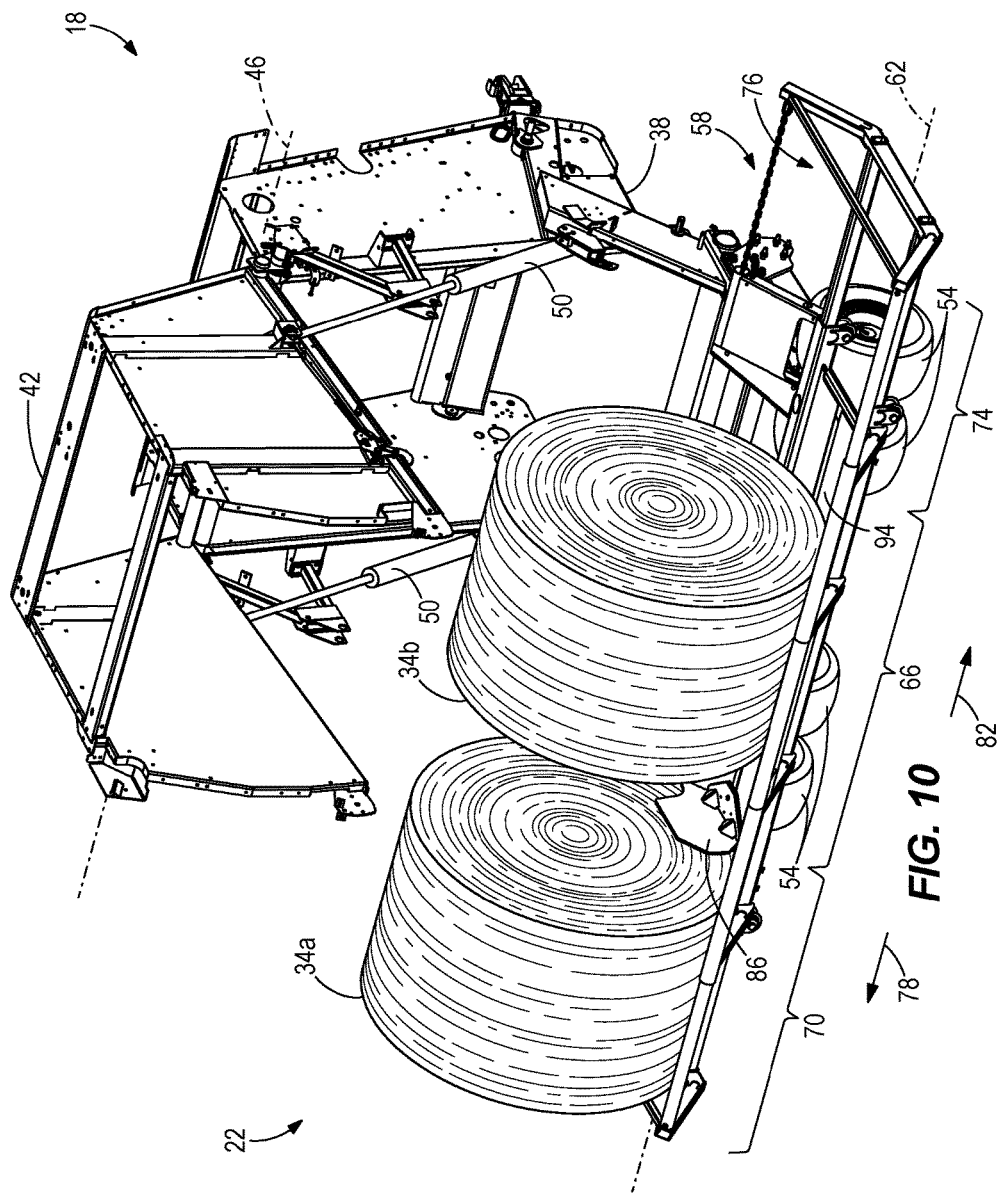
FIG. 10 is a perspective view of the baler and the accumulator with the second crop package located in the middle position on the accumulator.

The operator again actuates the first selective control valve 122 back into the first position 122*a*, as shown in FIG. 4 (e.g., a third step of operation of the hydraulic control system 26). The baler 18 is now operable to form a second crop package 34*b*. Once the baler 18 completes the formation of the second crop package 34*b*, the baler electrically conveys a signal to the cab 30 indicating to the operator of the tractor 14 to again actuate the gate 42 to the open position (FIG. 10).

The operator again actuates the first selective control valve 122 back into the second position 122*b* to index the hydraulic control system 26 into the configuration as illustrated in FIG. 9 (e.g., a fourth step in operation of the hydraulic control system 26). The hydraulic control system 26 operates in a similar manner to what has been previously described in view of FIG. 5 and the first step of operation.

Figure 11:
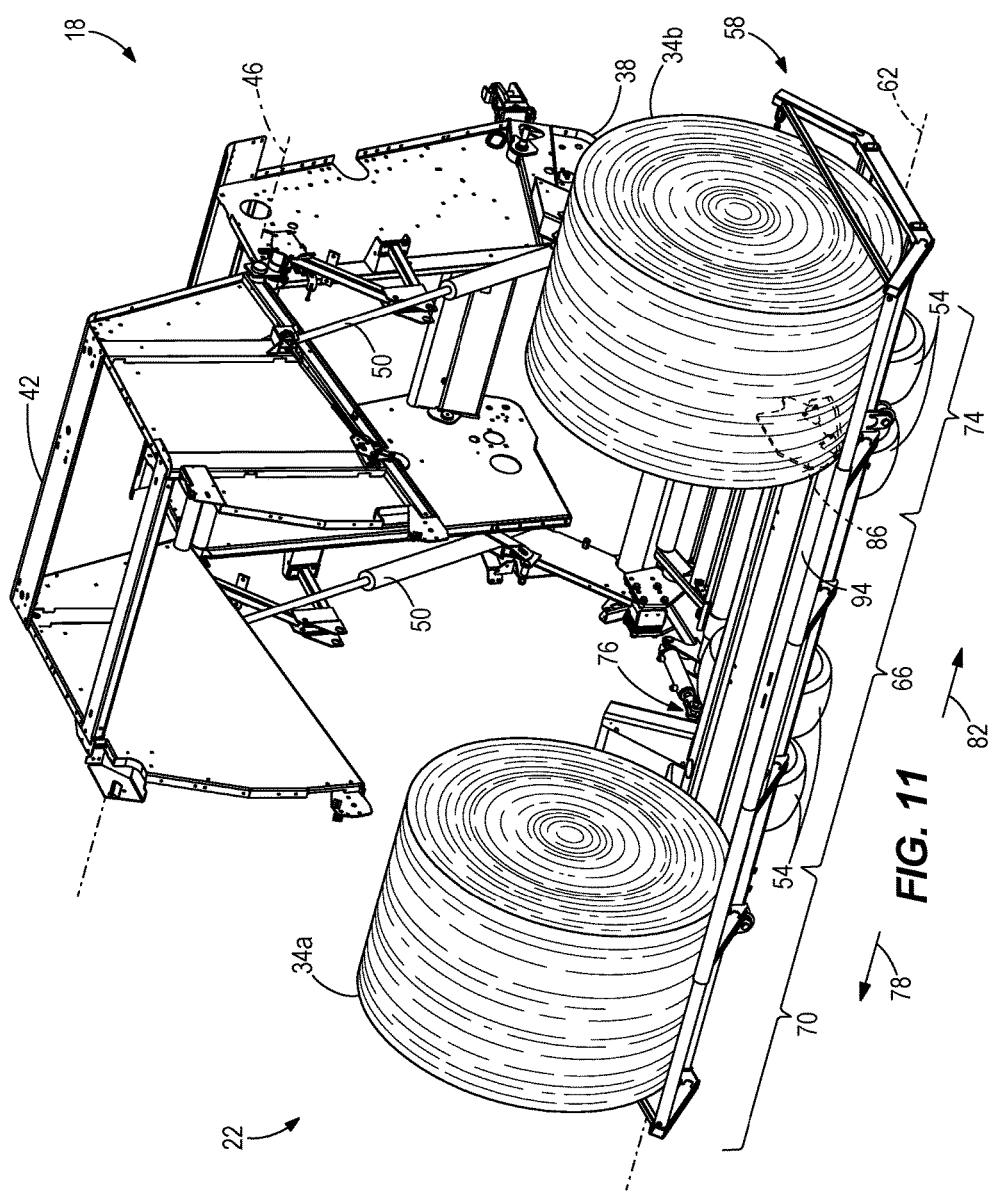
FIG. 11 is a perspective view of the baler and the accumulator with the second crop package located in a second side position on the accumulator.

In particular, the pump 114 fully opens the gate hydraulic actuators 50, the second crop package 34*b* exits the baler 18 and onto the middle frame portion 66, and hydraulic pressure travels through the switching valve 166 to equalize the pressure of the hydraulic switching actuators 162. However, because the second selective control valve 138 is in the second position 138*b*, hydraulic fluid now travels to the second crop package hydraulic actuator 106*b*. As such, the second sprocket 110*b*, the bale moving member 86, and the first sprocket 110*a* move in the direction 82 to push the second crop package 34*b* to the second side portion 74 (FIG. 11).

Should hydraulic pressure within the second crop package hydraulic actuator 106*b* become too great, e.g., if a force is obstructing movement of the bale moving member 86, the override mechanism 164 enables hydraulic fluid within the third hydraulic line 134 to release excess pressure to the second hydraulic line 130 via the second control valve 176. As such, hydraulic pressure within the second crop package hydraulic actuator 106*b* does not exceed a maximum hydraulic pressure.

Figure 12:
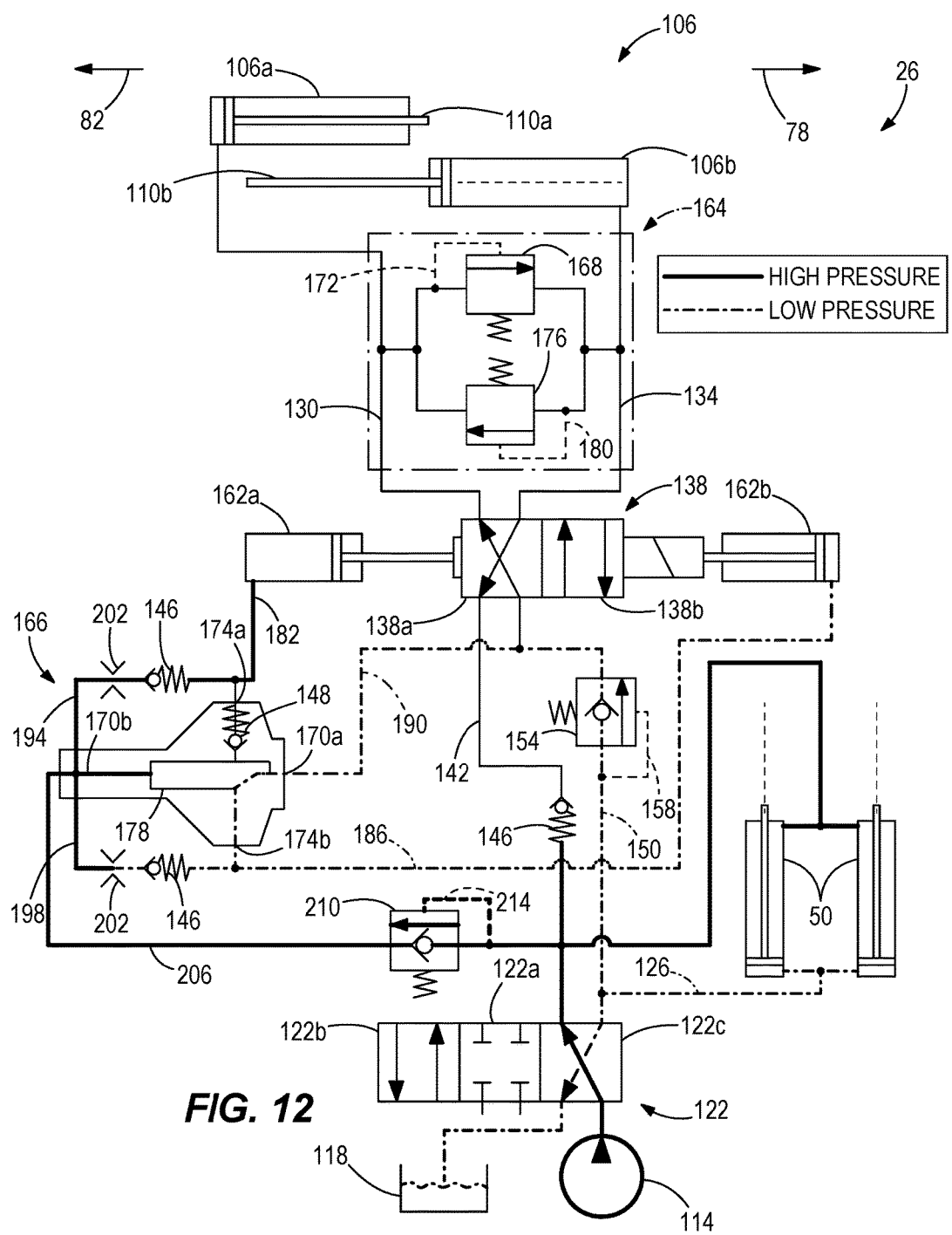
FIG. 12 is a schematic diagram of the hydraulic system of FIG. 4 in a fourth configuration when the gate of the baler closes after the second crop package exits the baler.

The operator then actuates the first selective control valve 122 into the third position 122*c* to index the hydraulic control system 26 into the configuration as illustrated in FIG. 12 (e.g., a fifth step of operation of the hydraulic control system 26). The configuration of the hydraulic control system 26 illustrated in FIG. 12 is similar to the configuration of the hydraulic control system 26 illustrated in FIG. 8 (e.g., the second step of operation) with the gate 42 in the closed position. However, as hydraulic fluid moves the switching member 178 towards the first aperture 170*a*, the switching valve 166 indexes to provide fluid communication between the first aperture 170*a* and the fourth aperture 174*b*, but does not provide fluid communication between the first aperture 170*a* and the third aperture 174*a*. In particular, the switching member 178 engages the check valve 148, associated with the fourth aperture 174*b*, to allow hydraulic fluid to flow opposite of the allowed flow direction of the check valve 148.

Hydraulic fluid travels through the check valve 146 and the orifice valve 202, e.g., the ninth hydraulic line 194, to the first hydraulic switching actuator 162*a* to move the second selective control valve 138 into the first position 138*a*. In turn, hydraulic fluid is pushed out of the second hydraulic switching actuator 162*b*. The orifice valve 202, associated with the tenth hydraulic line 198, provides enough back pressure within the hydraulic lines 186, 198 such that hydraulic fluid pressurized from the pump 114 does not move past the check valve 146, and the hydraulic fluid pushed out of the second hydraulic switching actuator 162*b* is allowed to flow through the switching valve 166 and into the reservoir 118.

The operator of the tractor 14 can optionally remove the first and the second crop packages 34*a*, 34*b* from the accumulator 22 by pivoting the baler frame 38 about the second axis 62 to allow the crop packages 34*a*, 34*b* to roll out of the bale carriage area 76. In other embodiments, the baler 18 may formulate a third crop package that can be located within the middle frame portion 66 before the operator decides to remove the crop packages 34 from the accumulator 22.

In general, the hydraulic control system 26 couples the movement of the crop package hydraulic actuators 106—and ultimately the movement of the crop packages—with the opening movement of the baler gate 42 during a first actuation of the first selective control valve 122 and couples the switching of the second selective control valve 138 with the closing movement of the baler gate 42 during a second actuation of the first selective control valve 122.

Although a particular accumulator is disclosed in this application, some embodiments of the disclosure can be applied to other accumulators that operate in similar or different manners. For example, the present disclosure can be utilized in any accumulator that moves crop packages of any shape in at least two different directions during accumulation of the crop packages. Also, the present disclosure can be utilized with any baler having an actuator (e.g., hydraulic actuator) for operating the gate or other mechanism of the baler. The control system 26 is, moreover, operable with other agricultural equipment such as planting equipment, tillage equipment, etc. to move agricultural product in a similar manner.

Additionally, the illustrated hydraulic control system 26 is not limited to agricultural systems or equipment and can be utilized with other applications. For example, the hydraulic control system 26 may be combined with, coupled to, or otherwise operable with construction equipment, forestry equipment, packaging and sorting systems, assembly line operations, automotive systems, aerospace systems, etc. In such applications, the crop product barrier may be termed a product barrier and the crop package engagement member may be termed a product engagement member. The product barrier and the product engagement member may move relative to each other in a similar way or sequence as discussed above to move product, e.g., construction materials, lumber, packages, assembled parts, etc.

FIGS. 13-16 illustrate a hydraulic control system 326 coupled to the agricultural equipment 10 according to an embodiment of the disclosure. The hydraulic control system 326 is similar to the hydraulic control system 26 with similar components including similar reference numbers incremented by 300. Only the differences between the systems 26, 326 will be described in detail. In addition, components or features described with respect to only one or some of the embodiments described herein are equally applicable to any other embodiments described herein.

The hydraulic control system 326 includes a first selective control valve 422 positionable in three positions, a first position 422a, a second position 422b (FIG. 14), and a third position 422c (FIG. 13) and is coupled to the hydraulic pump 114 and the hydraulic reservoir 118 of the tractor 14. The first control valve 422 is fluidly coupled to the gate hydraulic actuators 50 by a first hydraulic line 426 including a fluidly actuated check valve 427 that selectively operates between a conventional check valve (e.g., inhibiting flow from the gate actuators 50 to the first control valve 422 via the first hydraulic line 426) and no check valve (e.g., allowing flow from the gate actuators 50 to the first control valve 422 via the first hydraulic line 426). The fluidly actuated check valve 427 is biased into the conventional check valve configuration.

The first selective control valve 422 is directly coupled to a second selective control valve 438 by a fourth hydraulic line 442 including a check valve 446 and a fifth hydraulic line 450. The hydraulic lines 442, 450 are selectively coupled to the crop package hydraulic actuator 106 via a second line 430 and a third line 434. The second selective control valve 438 is positionable in a first position 438a (FIG. 13) and in a second position 438b (FIG. 15) by hydraulic switching actuators 462a, 462b. A hydraulic line 451 fluidly couples the fifth hydraulic line 450 to the fluidly actuated check valve 427 of the first hydraulic line 426 and includes a third relief check valve 453 (operating similar to the first relief check valve 154) having a relief line 455.

The illustrated hydraulic control system 326 also includes a switching valve 466 having a translating switching member 478, a first aperture 470a, a second aperture 470b, a third aperture 474a, a fourth aperture 474b, and mechanically actuated check valves 448. The third aperture 474a is directly coupled to the first hydraulic switching actuator 462a by a sixth hydraulic line 482, and the fourth aperture 474b is directly coupled to the second hydraulic switching actuator 462b by a seventh hydraulic line 486. The first aperture 470a is directly coupled to the fifth hydraulic line 450 by an eighth hydraulic line 490, and the second aperture 470b is in fluid communication with the sixth hydraulic line 482 via a ninth hydraulic line 494 and is in fluid communication with the seventh hydraulic line 486 via a tenth hydraulic line 498. The ninth and the tenth hydraulic lines 494, 498 both include a check valve 446 and an orifice valve 502. An eleventh hydraulic line 506 fluidly couples the gate hydraulic actuators 50 and the switching valve 466 via the first hydraulic line 426.

Figure 13:
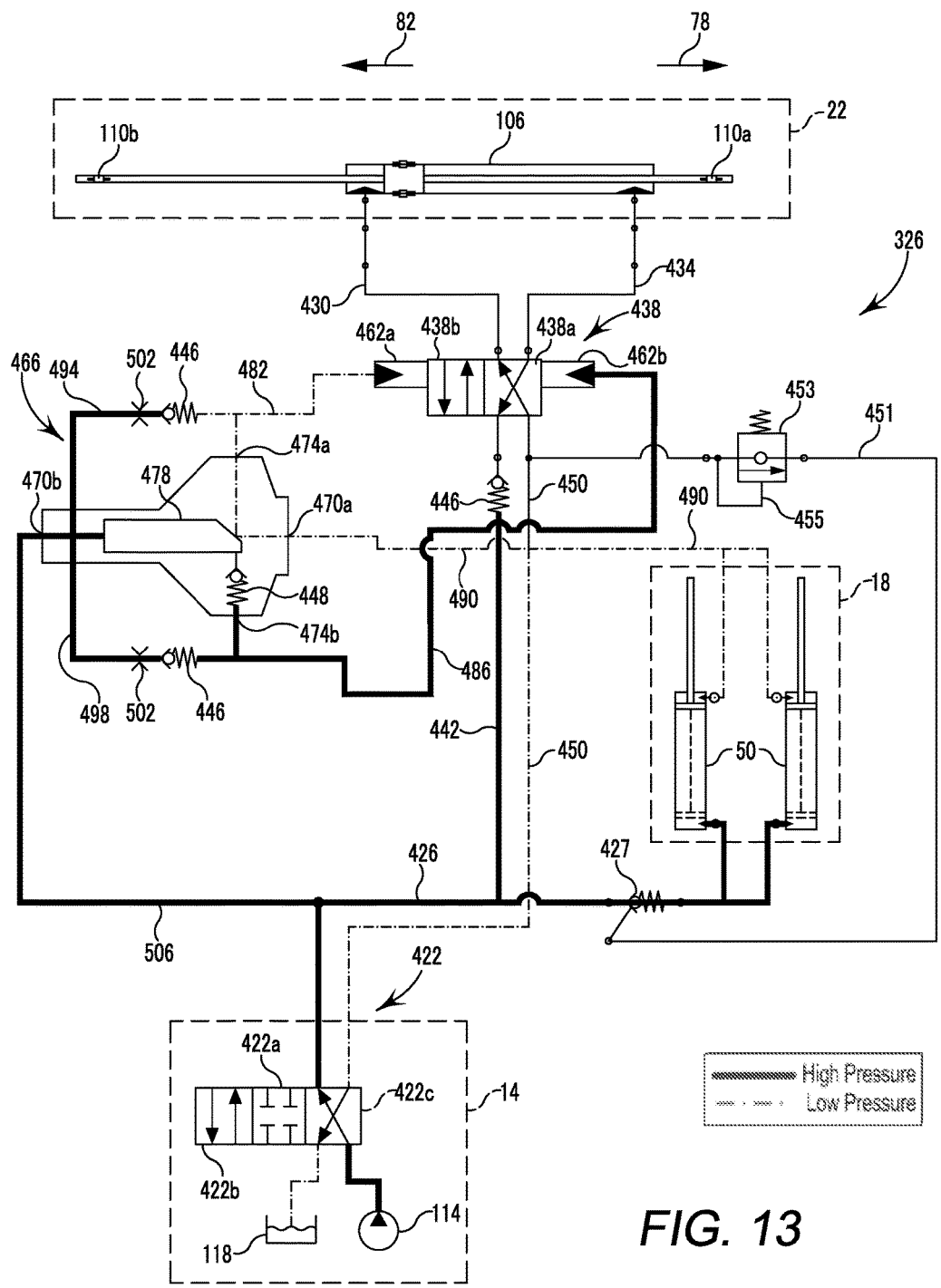
FIG. 13 is a schematic diagram of another embodiment of a hydraulic system in a first configuration coupled to the agricultural equipment of FIG. 1.

With reference to FIG. 13, the operator actuates the first selective control valve 422 into the third position 422c (e.g., a first step of operation of the hydraulic control system 326), providing hydraulic fluid to the gate hydraulic actuators 50 to raise the gate 42 into the open position. The hydraulic fluid also actuates the second switching actuator 462b through the switching valve 466 (via the hydraulic lines 506, 498, 486) to move or switch the control valve 438 into the first position 438a. When the gate 42 is in the fully open position, e.g., gate hydraulic actuators 50 are fully extended, the first crop package 34a exits the baler 18 and moves onto the accumulator 22 (FIG. 6).

Figure 14:
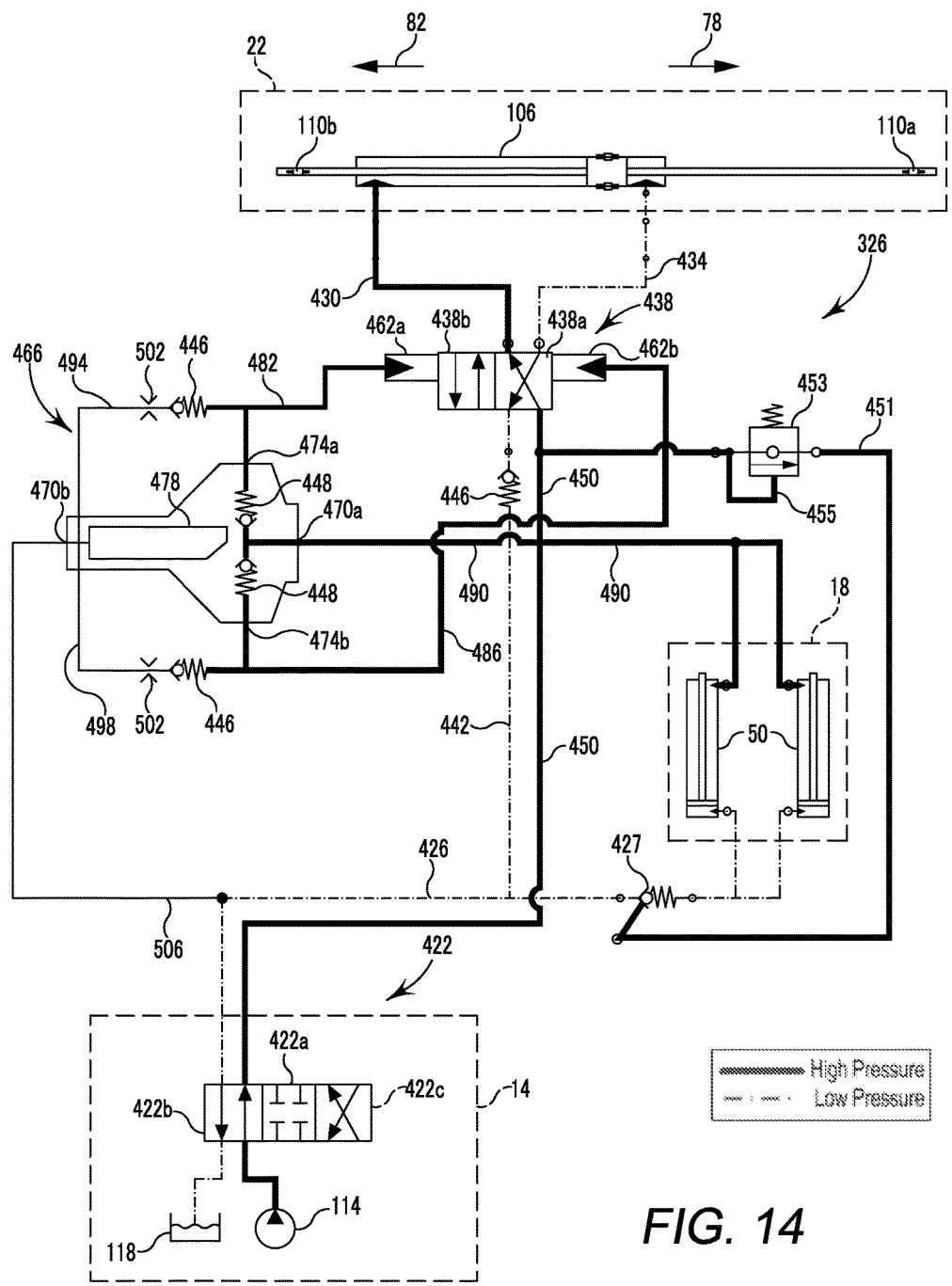
FIG. 14 is a schematic diagram the hydraulic system of FIG. 13 in a second configuration.

With reference to FIG. 14, the operator then actuates the first selective control valve 422 into the second position 422b (e.g., a second step of operation of the hydraulic control system 326), providing hydraulic fluid through the switching valve 466 to actuate both switching actuators 462a, 462b (via the hydraulic lines 450, 490, 482, 486) to maintain the second control valve 438 in the first position 438a. The hydraulic fluid also travels to the crop package hydraulic actuator 106 through the second selective control valve 438 (via the hydraulic lines 450, 430) to move the bale moving member 86 and the first crop package 34a in the first direction 78 (FIG. 7). While the bale moving member 86 is moving in the first direction 78, the baler gate 42 is maintained in the open position because the check valve 724 inhibits hydraulic fluid to flow into the reservoir 118, thereby holding the hydraulic actuators 50 stationary. After the hydraulic actuator 106 is fully extended in the first position 78, hydraulic pressure increases within the hydraulic line 451 until the pressure exceeds the predetermined pressure of the third relief check valve 453, and the hydraulic fluid bypasses the third relief check valve 453 via the relief line 455. The hydraulic fluid then interacts with the fluidly actuated check valve 427 to open the fluidly actuated check valve 427 to allow fluid to move from the gate hydraulic actuators 50 into the reservoir 118 enabling the baler gate 42 to close. The first selective control valve 422 is then positioned in the first position 422a and the baler 18 forms the second crop package 34b.

Figure 15:
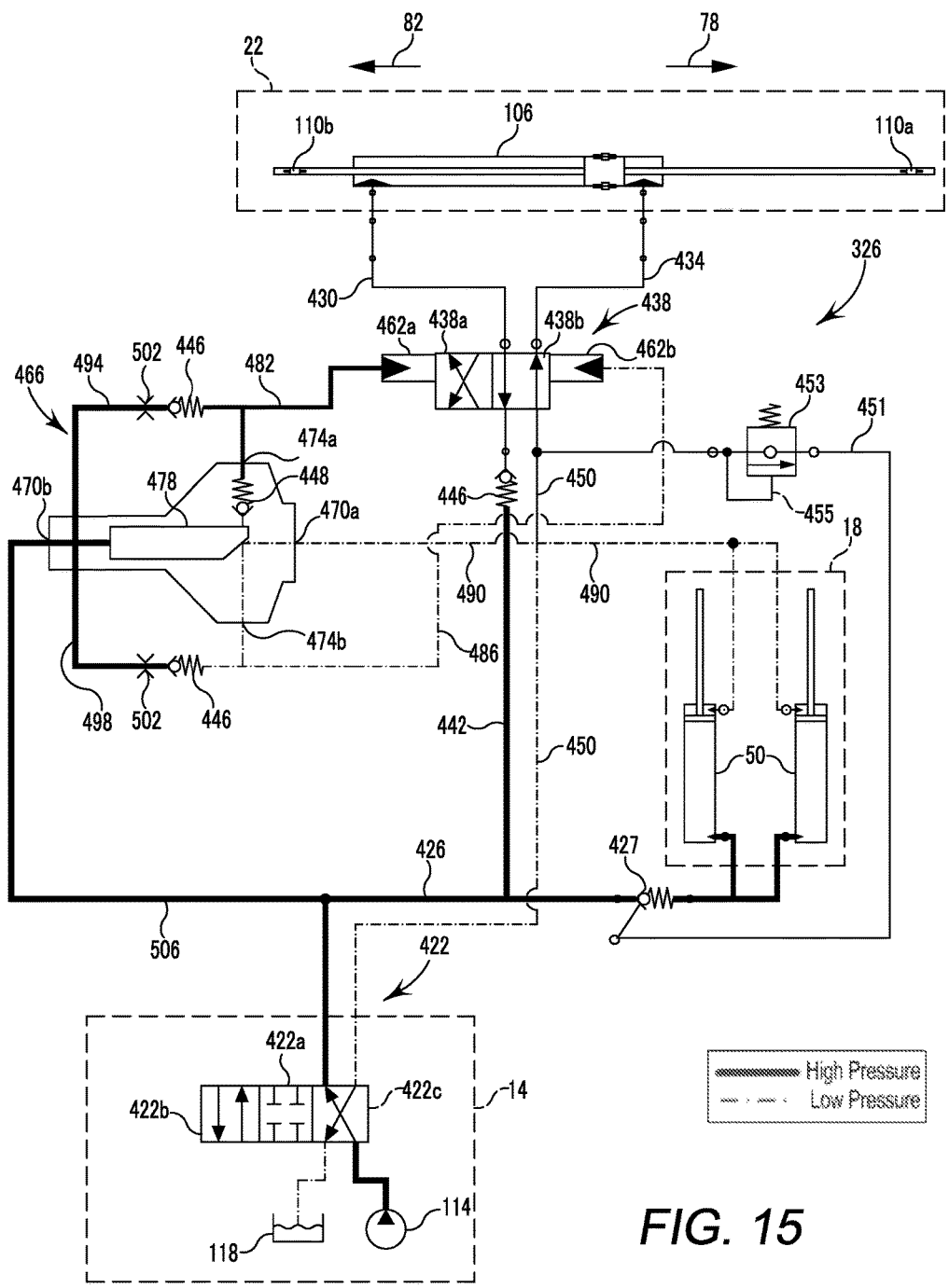
FIG. 15 is a schematic diagram the hydraulic system of FIG. 13 in a third configuration.

With reference to FIG. 15, the operator actuates the first selective control valve 422 back into the third position 422c (e.g., a third step of operation of the hydraulic control system 326), providing hydraulic fluid to the gate hydraulic actuators 50 to again raise the gate 42 into the open position. The hydraulic fluid also actuates the first switching actuator 462a (via the hydraulic lines 506, 494, 482) to switch the control valve 438 into the second position 438b. When the gate 42 is in the fully open position, the second crop package 34b exits the baler 18 and moves onto the accumulator 22 (FIG. 10).

Figure 16:
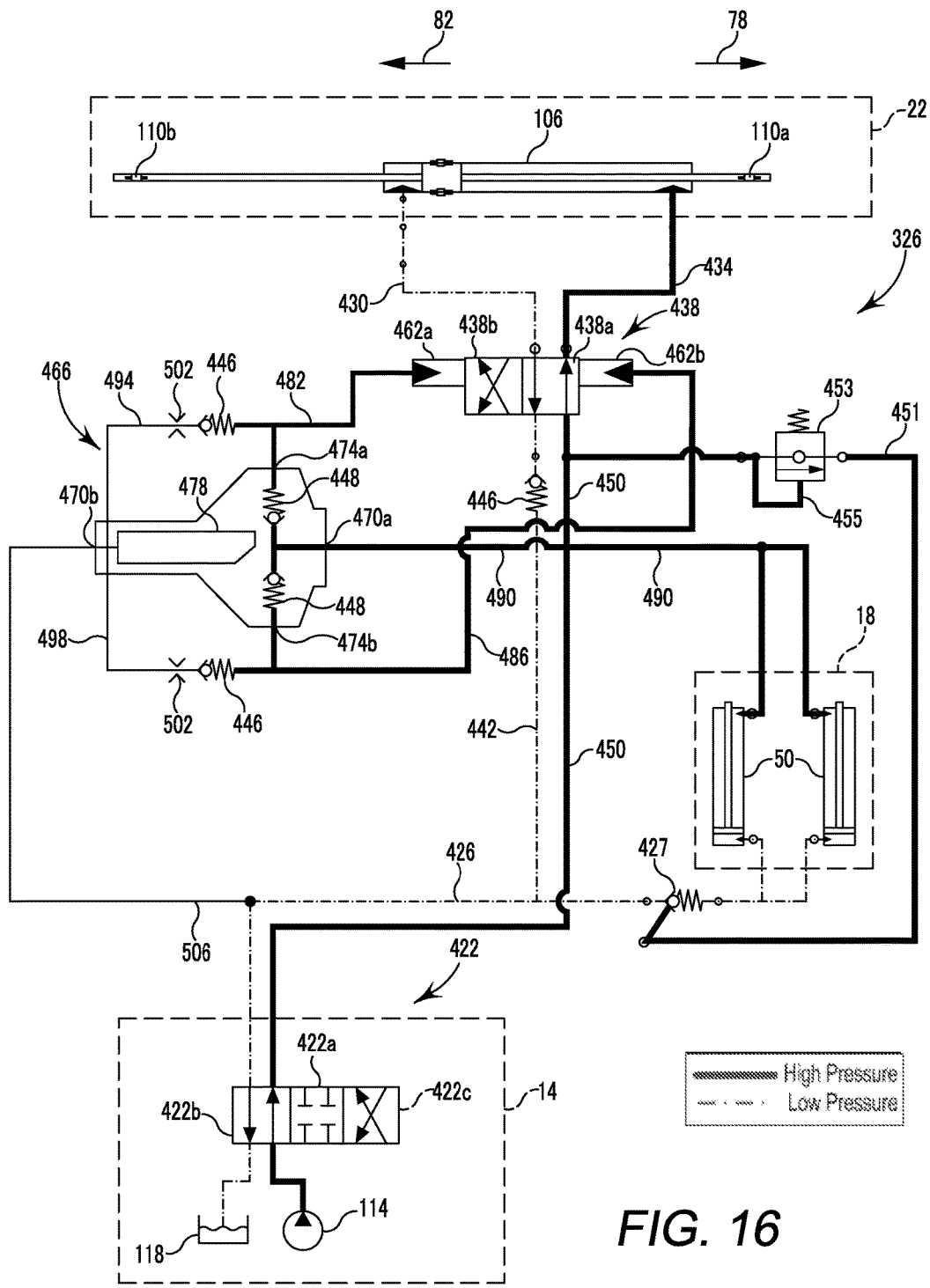
FIG. 16 is a schematic diagram the hydraulic system of FIG. 13 in a fourth configuration.

With reference to FIG. 16, the operator then actuates the first selective control valve 422 back into the second position 422b (e.g., a fourth step of operation of the hydraulic control system 326), providing hydraulic fluid through the switching valve 466 to actuate both switching actuators 462a, 462b (via the hydraulic lines 450, 490, 482, 486) to maintain the second control valve 438 in the second position 438b. The hydraulic fluid also travels to the crop package hydraulic actuator 106 through the second selective control valve 438 (via the hydraulic lines 450, 434) to move the bale moving member 86 and the second crop package 34b in the second direction 82 (FIG. 11). While the bale moving member 86 is moving in the second direction 82, the baler gate 42 is maintained in the open position because the check valve 724 inhibits hydraulic fluid to flow into the reservoir 118, thereby holding the hydraulic actuators 50 stationary. After the hydraulic actuator 106 is fully extended in the second position 82, hydraulic pressure again increases within the hydraulic line 451 until the pressure exceeds the predetermined pressure of the third relief check valve 453, and the hydraulic fluid bypasses the third relief check valve 453 via the relief line 455. The hydraulic fluid then interacts with the fluidly actuated check valve 427 to open the fluidly actuated check valve 427 to allow fluid to move from the gate hydraulic actuators 50 into the reservoir 118 enabling the baler gate 42 to close again.

In other embodiments, the hydraulic line 451 and the fluidly actuated check valve 427 may be omitted and replaced with the third relief check valve 453 coupled to the eighth hydraulic line 490 fluidly between the gate actuators 50 and the fifth hydraulic line 450. In this embodiment, the third relief check valve 453 allows fluid to freely flow from the gate actuators 50 to the switching valve 466, but allows the hydraulic fluid to increase in pressure within the eighth hydraulic line 490 until the pressure exceeds the predetermined pressure of the third relief check valve 453. Once the predetermined pressure is exceeded, the hydraulic pressure is able to bypass the third relief check valve 453 via the relief line 455 to travel to the gate actuators 50 to close the baler gate 42 (FIGS. 14 and 16). In this embodiment, the third relief check valve 453 continues to ensure that the crop package hydraulic actuator 106 is fully extended in either direction 78, 82 before the baler gate 42 begins to close.

In further embodiments, the hydraulic line 451 and the fluidly actuated check valve 427 may be omitted and replaced with the third relief check valve 453 coupled to the first hydraulic line 426 fluidly between the gate actuators 50 and the fourth hydraulic line 442 (e.g., in the position where the fluidly actuated check valve 427 was removed). In this embodiment, the third relief check valve 453 allows hydraulic fluid to freely flow from the first selective control valve 422 to the gate actuators 50, but allows the hydraulic fluid to increase in pressure within the first hydraulic line 426 until the pressure exceeds the predetermined pressure of the third relief check valve 453. Once the predetermined pressure is exceeded, the hydraulic pressure is able to bypass the third relief check valve 453 via the relief line 455 to travel to the first selective control valve 422 allowing the baler gate 42 to close (FIGS. 14 and 16). In this embodiment, the third relief check valve 453 continues to ensure that the crop package hydraulic actuator 106 is fully extended in either direction 78, 82 before the baler gate 42 begins to close.

In general, the hydraulic control system 326 couples the switching of the second selective control valve 438 with the opening movement of the baler gate 42 during a first actuation of the first selective control valve 422 and couples the movement of the bale moving member 86 and the crop packages 34a, 34b with the closing movement of the baler gate 42 during a second actuation of the first selective control valve 422.

FIGS. 17-21 illustrate a hydraulic control system 526 coupled to the agricultural equipment 10 according to an embodiment of the disclosure. The hydraulic control system 526 is similar to the hydraulic control system 326 with similar components including similar reference numbers incremented by 200. Only the differences between the systems 326, 526 will be described in detail. In addition, components or features described with respect to only one or some of the embodiments described herein are equally applicable to any other embodiments described herein.

The hydraulic control system 526 includes a first selective control valve 622 positionable in three positions, a first position 622a, a second position 622b (FIG. 17), and a third position 622c (FIG. 19) and is coupled to the hydraulic pump 114 and the hydraulic reservoir 118 of the tractor 14. The first control valve 622 is fluidly coupled to the gate hydraulic actuators 50 by a first hydraulic line 626 and a second hydraulic line 639 but does not actuate the crop package hydraulic actuator 106 in contrast to the hydraulic control system 326.

The first selective control valve 622 is fluidly coupled to a second selective control valve 638 by a switching valve 666 with the first hydraulic line 626 and the second hydraulic line 639 fluidly coupling the first selective control valve 622 to the switching valve 666. The first hydraulic line 626 includes a relief check valve 653 having a relief line 655. The second selective control valve 638 is positionable in a first position 638a (FIG. 17) and in a second position 638b (FIG. 20) by hydraulic switching actuators 662a, 662b.

The illustrated switching valve 666 includes a translating switching member 678, a first aperture 670a, a second aperture 670b, a third aperture 674a, a fourth aperture 674b, and mechanically actuated check valves 648. The first aperture 670a is directly coupled to the second hydraulic line 639, the second aperture 670b is directly coupled to the first hydraulic line 626, the third aperture 674a is directly coupled to the first hydraulic switching actuator 662a by a hydraulic line 682, and the fourth aperture 674b is directly coupled to the second hydraulic switching actuator 662b by a hydraulic line 686. The hydraulic lines 682, 686 are in fluid communication with the second aperture 670b via a hydraulic line 694 and a hydraulic line 698. The hydraulic lines 694, 698 both include a check valve 646 and an orifice valve 702.

Figure 17:
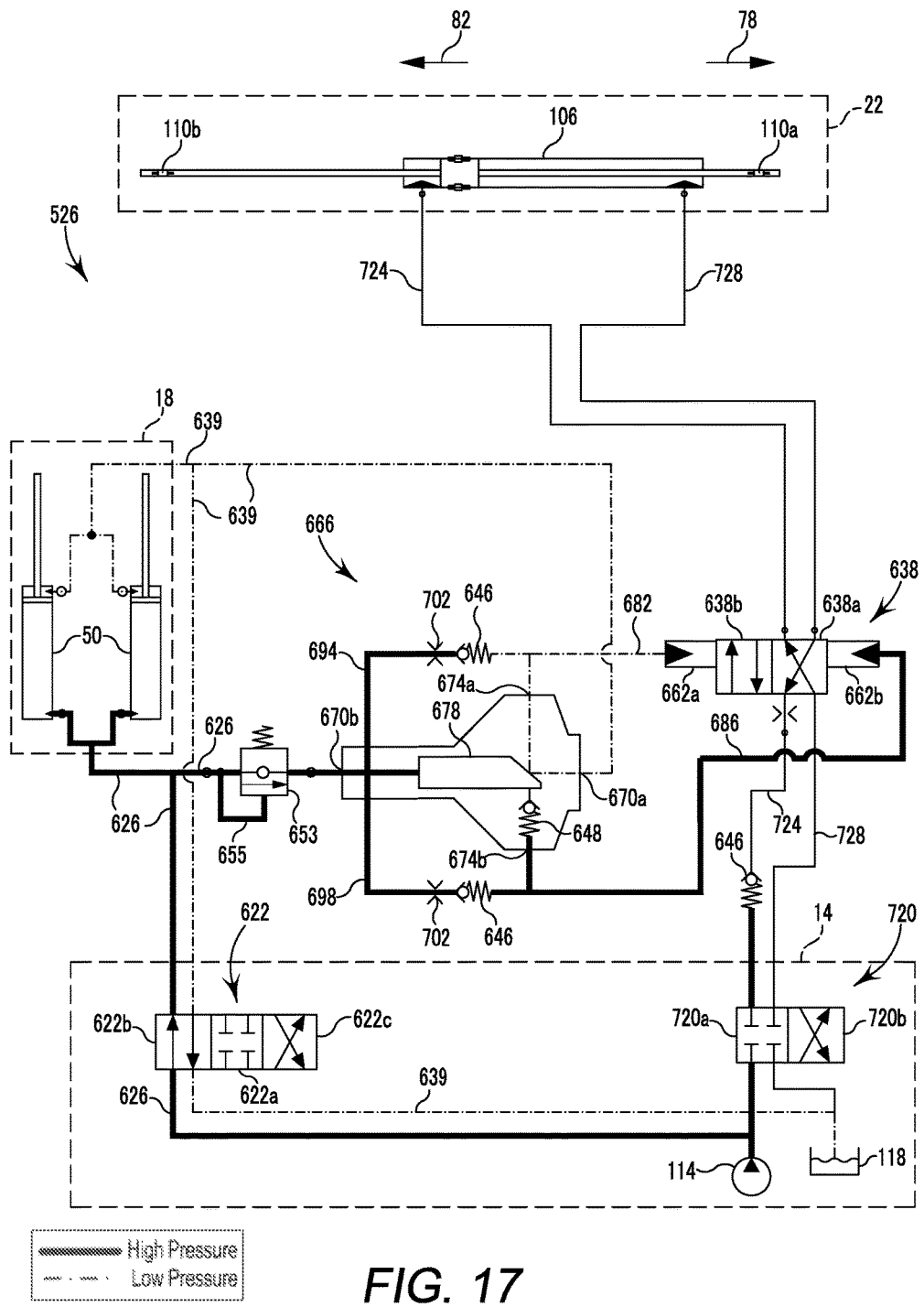
FIG. 17 is a schematic diagram of yet another embodiment of a hydraulic system in a first configuration coupled to the agricultural equipment of FIG. 1.
Figure 18:
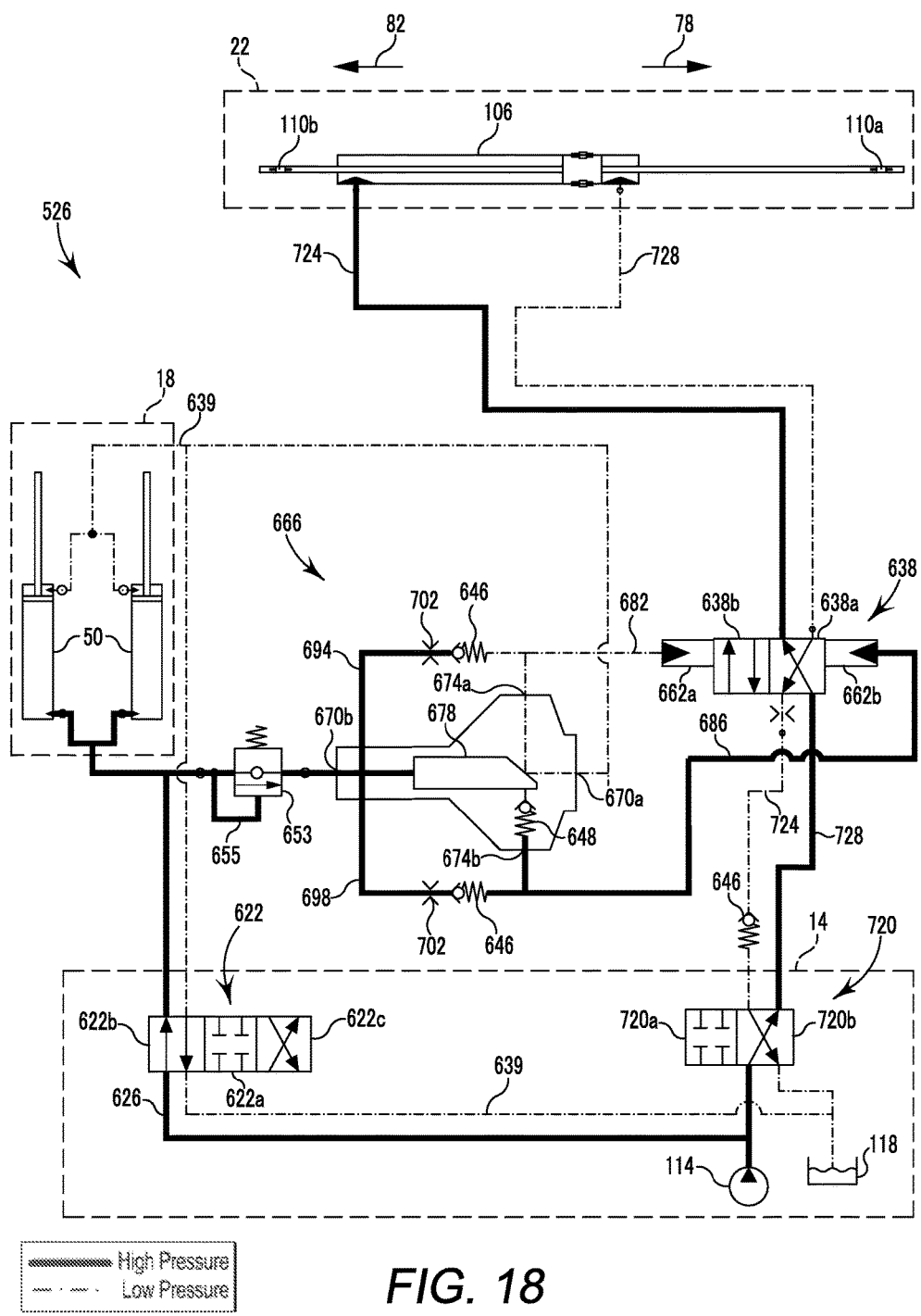
FIG. 18 is a schematic diagram of the hydraulic system of FIG. 17 in a second configuration.

In the illustrated embodiment, a third selective control valve 720 is in fluid communication with the pump 114, the reservoir 118, and the hydraulic actuator 106 via hydraulic lines 724, 728 and is positionable in a first position 720a (FIG. 17) and a second position 720b (FIG. 18). The third selective control valve 720 is also in fluid communication with the second selective control valve 638 via the hydraulic lines 724, 728 with the hydraulic line 724 including a check valve 646 positioned between the selective control valves 638, 720.

With reference to FIG. 17, the operator actuates the first selective control valve 622 into the second position 622b (e.g., a first step of operation of the hydraulic control system 526), providing hydraulic fluid to the gate hydraulic actuators 50 to raise the gate 42 into the open position via the hydraulic line 626. When the gate 42 is in the fully open position, e.g., gate hydraulic actuators 50 are fully extended, the first crop package 34a exits the baler 18 and moves onto the accumulator 22 (FIG. 6). The hydraulic pressure increases in the first hydraulic line 626 until the pressure exceeds the predetermined pressure of the check relief valve 653. After the pressure exceeds the predetermined pressure, the hydraulic fluid passes through the check relief valve 653 via the relief line 655 to actuate the second switching actuator 662b (via the hydraulic lines 698, 686) to move the control valve 638 into the first position 638a.

With reference to FIG. 18, the operator then actuates the third selective control valve 720 into the second position 720b (e.g., a second step of operation of the hydraulic control system 526), providing hydraulic fluid to the hydraulic actuator 106 (via hydraulic lines 728, 724) to move the bale moving member 86 and the first crop package 34a in the first direction 78 (FIG. 7).

Figure 19:
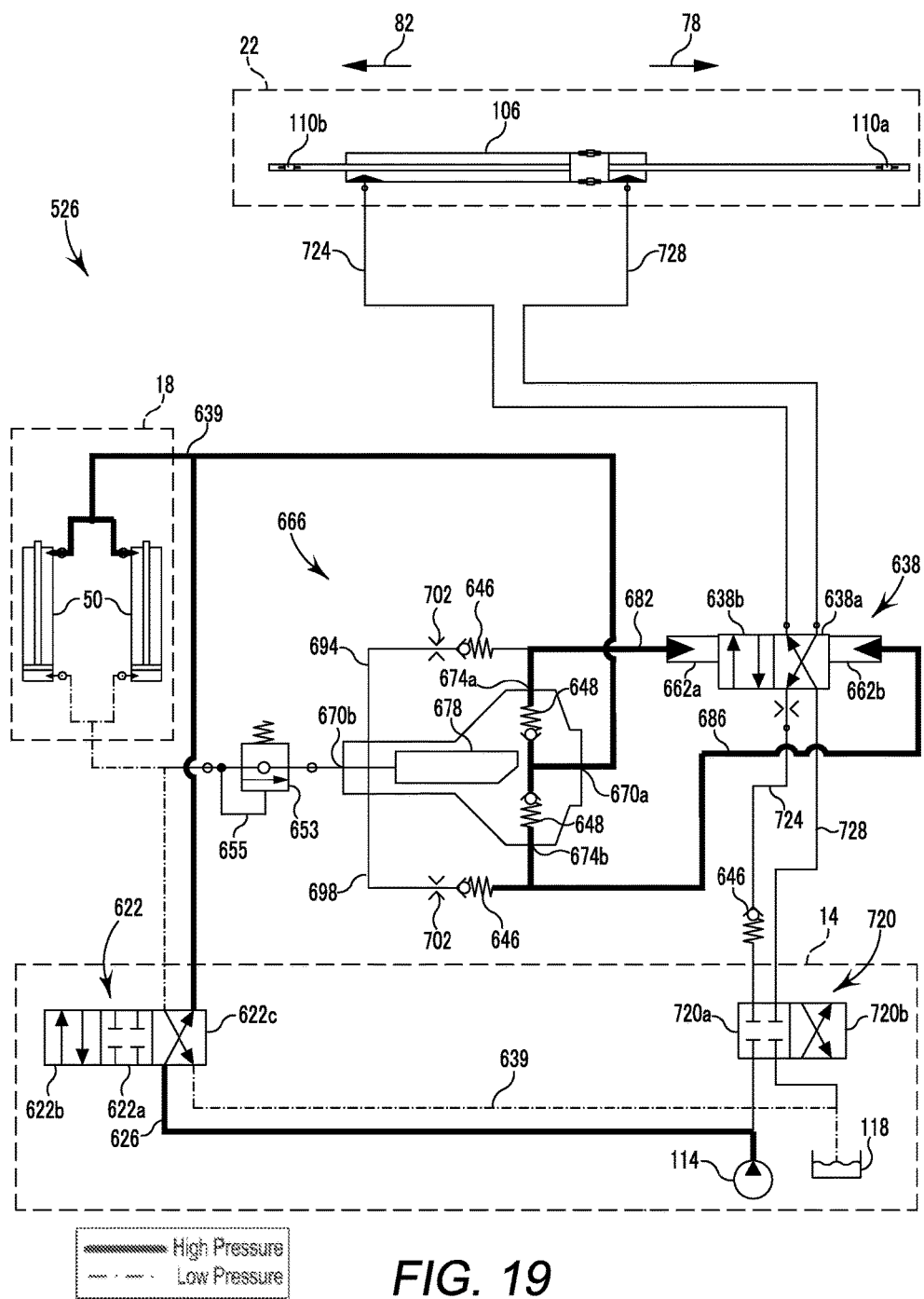
FIG. 19 is a schematic diagram the hydraulic system of FIG. 17 in a third configuration.

With reference to FIG. 19, the operator actuates the third selective control valve 720 into the first position 720a and also actuates the first selective control valve 622 into the third position 622c (e.g., a third step of operation of the hydraulic control system 526). Hydraulic fluid then flows to the gate hydraulic actuators 50 to close the baler gate 42 (via the hydraulic line 639) and flows into the switching valve 666 to switch the orientation of the switching member 678 (via the hydraulic line 639). During this step of operation, the hydraulic fluid actuates both hydraulic switching actuators 662a, 662b (via the hydraulic lines 639, 682, 686) to maintain the second selective control valve 638 in the first position 638a. The first selective control valve 622 is then positioned in the first position 622a and the baler 18 forms the second crop package 34b.

Figure 20:
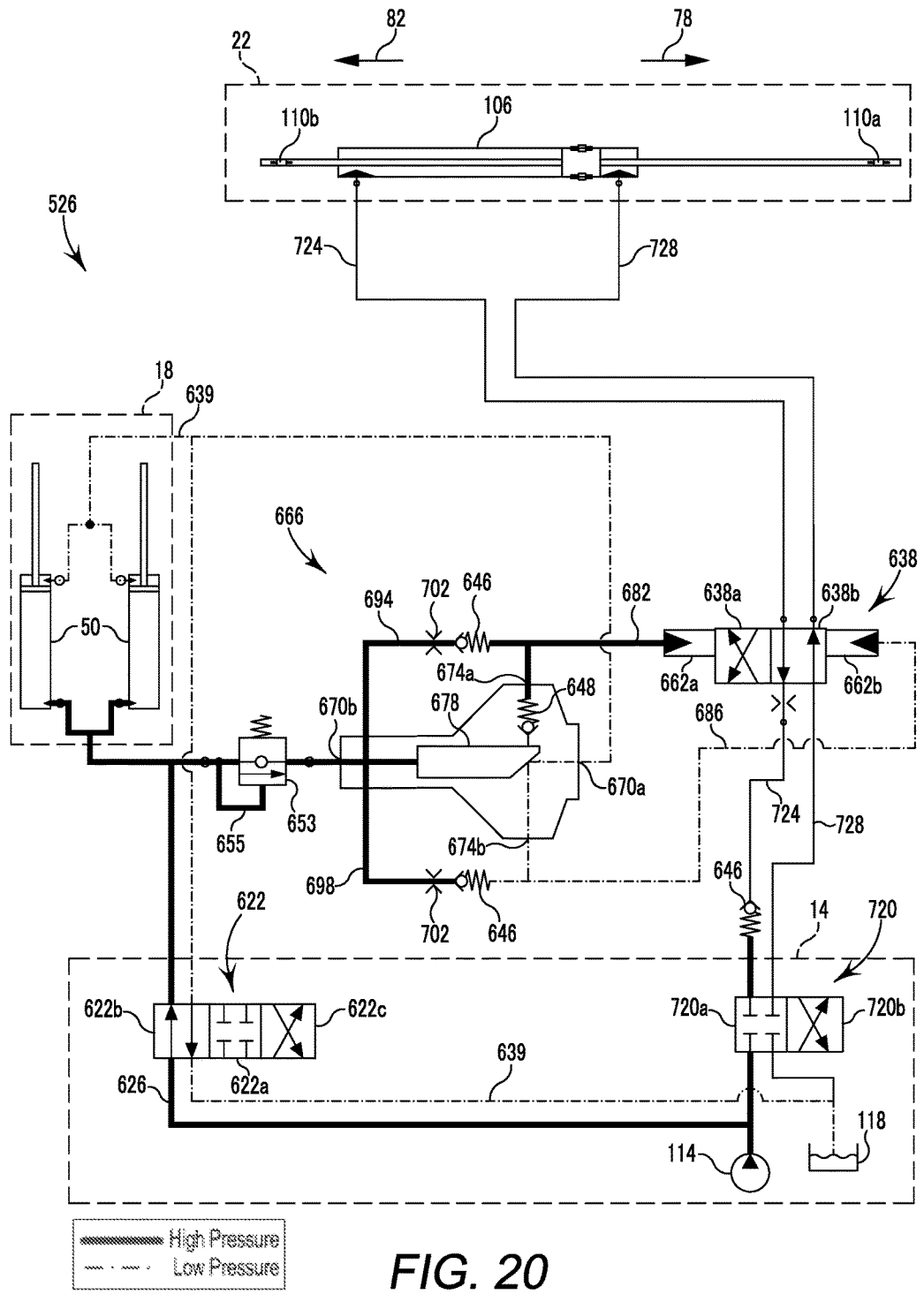
FIG. 20 is a schematic diagram the hydraulic system of FIG. 17 in a fourth configuration.

With reference to FIG. 20, the operator actuates the first selective control valve 622 back into the second position 622b (e.g., a fourth step of operation of the hydraulic control system 526), providing hydraulic fluid to the gate hydraulic actuators 50 to again raise the gate 42 into the open position (via the hydraulic line 626). When the gate 42 is in the fully open position, the second crop package 34b exits the baler 18 and moves onto the accumulator 22 (FIG. 10). The hydraulic pressure increases in the first hydraulic line 626 until the pressure exceeds the predetermined pressure of the check relief valve 653. After the pressure exceeds the predetermined pressure, the hydraulic fluid passes through the check relief valve 653 via the relief line 655 to actuate the first switching actuator 662a (via the hydraulic lines 694, 682) to switch the control valve 638 into the second position 638b.

Figure 21:
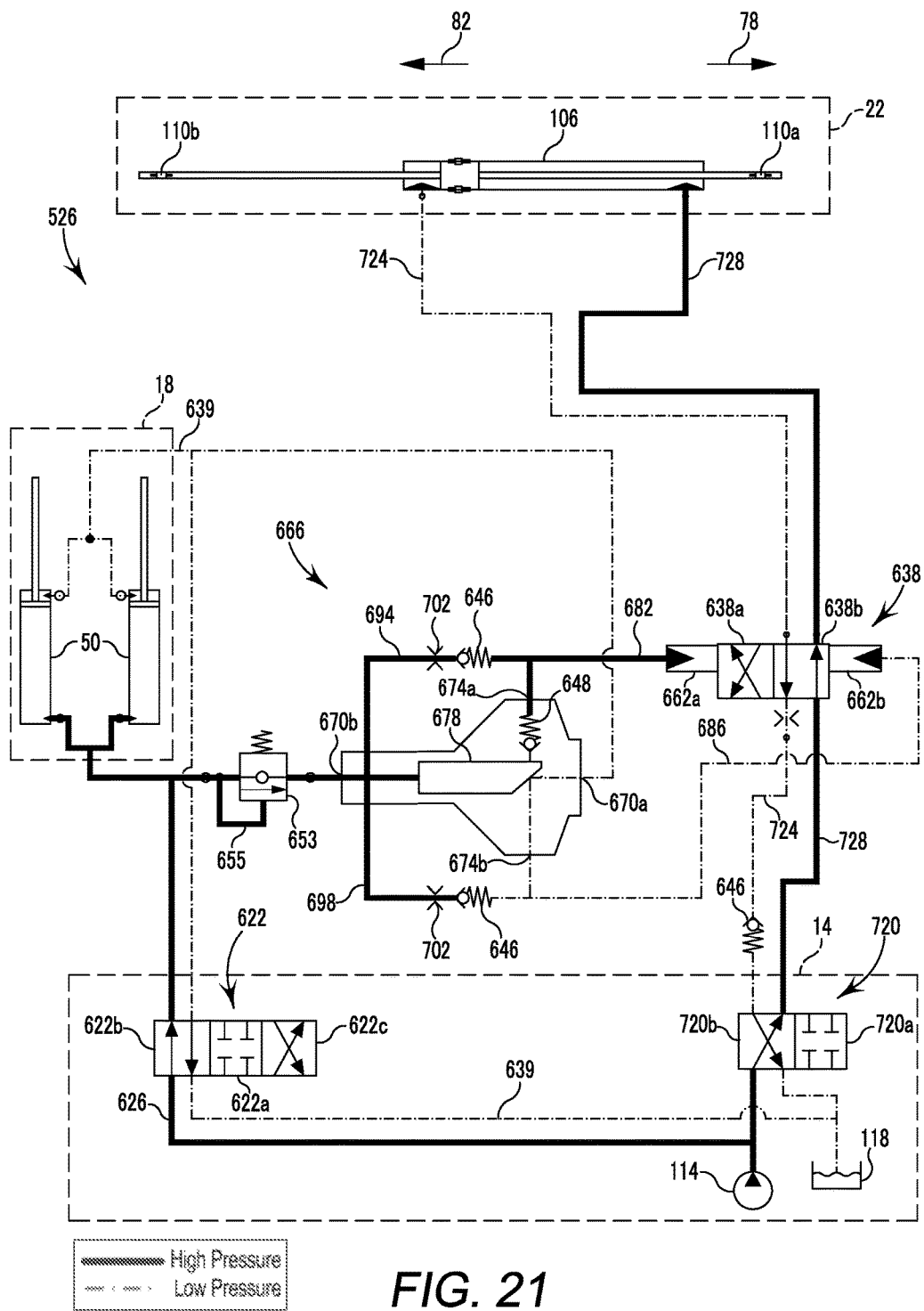
FIG. 21 is a schematic diagram the hydraulic system of FIG. 17 in a fifth configuration.

With reference to FIG. 21, the operator then actuates the third selective control valve 720 back into the second position 720b (e.g., a fifth step of operation of the hydraulic control system 526), providing hydraulic fluid to the hydraulic actuator 106 (via the hydraulic line 728) to move the bale moving member 86 and the second crop package 34b in the second direction 82 (FIG. 11). Subsequently, the operator repeats the third step of operation (e.g., a sixth step of operation of the hydraulic control system 526) to close the baler gate 42 (e.g., actuating the third selective control valve 720 into the first position 720a and also actuating the first selective control valve 622 into the third position 622c) for the baler 18 to produce another crop package.

In general, the hydraulic control system 526 provides independent control of moving the bale gate 42 into the open or closed position and moving the crop packages 34a, 34b on the accumulator 22. In particular, the control system 526 couples the switching of the second selective control valve 638 with the opening movement of the baler gate 42 during a first actuation of the first selective control valve 622 and couples the movement of the crop package hydraulic actuators 106 with actuation of the third selective control valve 720.

The invention claimed is:

1. A hydraulic circuit comprising:
a selective control valve actuatable between a first position and a second position;
a first hydraulic actuator operable to open and close a product barrier; and
a second hydraulic actuator operable to move a product engagement member, the hydraulic circuit configured such that
in a first step, the first hydraulic actuator opens the product barrier and the second hydraulic actuator moves the product engagement member in a first direction in response to movement of the selective control valve into the first position;
in a second step, the first hydraulic actuator closes the product barrier and the product engagement member remains in place in response to movement of the selective control valve into the second position;
in a third step, the first hydraulic actuator opens the product barrier and the second hydraulic actuator moves the product engagement member in a second direction opposite the first direction in response to movement of the selective control valve into the first position; and
in a fourth step, the first hydraulic actuator closes the product barrier and the product engagement member remains in place in response to movement of the selective control valve into the second position.

2. The hydraulic circuit of claim 1, wherein the selective control valve is actuatable in a third position, and wherein when the selective control valve is in the third position, the hydraulic circuit is not configured to move the product barrier and the product engagement member.

3. The hydraulic system of claim 2, wherein the selective control valve is configured to be sequentially actuated in the first position, the second position, and then the third position.

4. The hydraulic circuit of claim 1, wherein the selective control valve is a first selective control valve, and the hydraulic circuit further comprising a switching valve operable to switch a second selective control valve between a first position and a second position.

5. The hydraulic circuit of claim 4, wherein when the first selective control valve is in the first position and the second selective control valve is in the first position, the hydraulic circuit is configured to perform the first step.

6. The hydraulic circuit of claim 4, wherein when the first selective control valve is in the first position and the second selective control valve is in the second position, the hydraulic circuit is configured to perform the third step.

7. The hydraulic circuit of claim 4, wherein when the first selective control valve is in the second position and the second selective control valve is in one of the first position and the second position, the hydraulic circuit is configured to perform one of the second step and the fourth step.

8. The hydraulic circuit of claim 1, wherein the first hydraulic actuator is coupled to an agricultural baler, and the second hydraulic actuator is coupled to an accumulator, and wherein the accumulator is coupled to the agricultural baler and is configured to support crop packages exiting the baler, and wherein the product engagement member is configured to move the crop packages in the first and second directions.

9. The hydraulic circuit of claim 1, wherein the first hydraulic actuator opens the product barrier and then the second hydraulic actuator moves the product engagement member during the first and third steps.

10. A hydraulic circuit comprising:
a selective control valve actuatable between a first position and a second position;
a first hydraulic actuator operable to open and close a product barrier; and
a second hydraulic actuator operable to move a product engagement member, the hydraulic circuit configured such that
in a first step, the first hydraulic actuator opens the product barrier and the product engagement member remains in place in response to movement of the selective control valve into the first position;
in a second step, the second hydraulic actuator moves the product engagement member in a first direction and the first hydraulic actuator closes the product barrier in response to movement of the selective control valve into the second position;
in a third step, the first hydraulic actuator opens the product barrier and the product engagement member remains in place in response to movement of the selective control valve into the first position; and
in a fourth step, the second hydraulic actuator moves the product engagement member in a second direction opposite the first direction and the first hydraulic actuator closes the product barrier in response to movement of the selective control valve into the second position.

11. The hydraulic circuit of claim 10, wherein the selective control valve is actuatable in a third position, and wherein when the selective control valve is in the third position, the hydraulic circuit is not configured to move the product barrier and the product engagement member.

12. The hydraulic system of claim 11, wherein the selective control valve is configured to be sequentially actuated in the first position, the second position, and then the third position.

13. The hydraulic circuit of claim 12, wherein the selective control valve is a first selective control valve, and the hydraulic circuit further comprising a switching valve operable to switch a second selective control valve between a first position and a second position.

14. The hydraulic circuit of claim 13, wherein when the first selective control valve is in the second position and the second selective control valve is in the first position, the hydraulic circuit is configured to perform the second step.

15. The hydraulic circuit of claim 13, wherein when the first selective control valve is in the second position and the second selective control valve is in the second position, the hydraulic circuit is configured to perform the fourth step.

16. The hydraulic circuit of claim 13, wherein when the first selective control valve is in the first position and the second selective control valve is in one of the first position and the second position, the hydraulic circuit is configured to perform one of the first step and the third step.

17. The hydraulic circuit of claim 10, wherein the first hydraulic actuator is coupled to an agricultural baler, and the second hydraulic actuator is coupled to an accumulator, and wherein the accumulator is coupled to the agricultural baler and is configured to support crop packages exiting the baler, and wherein the product engagement member is configured to move the crop packages in the first and second directions.

18. The hydraulic circuit of claim 10, wherein the second hydraulic actuator moves the product engagement member and then the first hydraulic actuator closes the product barrier during the second and fourth steps.

19. A hydraulic circuit comprising:
a first selective control valve actuatable between a first position and a second position;
a second selective control valve actuatable in a first position;
a first hydraulic actuator operable to open and close a product barrier; and
a second hydraulic actuator operable to move a product engagement member, the hydraulic circuit configured such that
in a first step, the first hydraulic actuator opens the product barrier in response to movement of the first selective control valve into the first position;
in a second step, the second hydraulic actuator moves the product engagement member in a first direction in response to movement of the second selective control valve into the first position;
in a third step, the first hydraulic actuator closes the product barrier in response to movement of the first selective control valve into the second position;
in a fourth step, the first hydraulic actuator opens the product barrier in response to movement of the first selective control valve into the first position;
in a fifth step, the second hydraulic actuator moves the product engagement member in a second direction opposite the first direction in response to movement of the second selective control valve into the first position; and
in a sixth step, the first hydraulic actuator closes the product barrier in response to movement of the first selective control valve into the second position.

20. The hydraulic circuit of claim 17, wherein the first hydraulic actuator is coupled to an agricultural baler, and the second hydraulic actuator is coupled to an accumulator, and wherein the accumulator is coupled to the agricultural baler and is configured to support crop packages exiting the baler, and wherein the product engagement member is configured to move the crop packages in the first and second directions.

* * * * *